United States Patent [19]
Hirano et al.

[11] Patent Number: 5,943,054
[45] Date of Patent: *Aug. 24, 1999

[54] FUNCTION DESIGNATE METHOD FOR DESIGNATING A VARIETY OF FUNCTIONS TO BE PERFORMED BY A CONTROL UNIT

[75] Inventors: Toru Hirano; Kazumi Monden; Masumi Hosokawa; Kazuhiro Imaki; Akihide Shima, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/593,852

[22] Filed: Jan. 30, 1996

Related U.S. Application Data

[62] Division of application No. 07/997,930, Dec. 29, 1992, Pat. No. 5,553,277.

[51] Int. Cl.⁶ ............................................. G06F 17/30
[52] U.S. Cl. ............................................. 345/348; 345/352
[58] Field of Search .............................. 395/326, 333–335, 395/339, 347, 348, 349, 352–355; 345/348–354

[56] References Cited

U.S. PATENT DOCUMENTS

| | | | |
|---|---|---|---|
| 5,121,477 | 6/1992 | Koopmans et al. | 345/333 |
| 5,204,946 | 4/1993 | Shimamura | 395/763 |
| 5,220,648 | 6/1993 | Sato | 395/603 |
| 5,241,472 | 8/1993 | Gur et al. | 395/763 |
| 5,303,388 | 4/1994 | Kreitman et al. | 395/348 |
| 5,337,317 | 8/1994 | Bates et al. | 395/342 |
| 5,369,742 | 11/1994 | Kurosu et al. | 395/784 |

FOREIGN PATENT DOCUMENTS

| | | |
|---|---|---|
| 60-134679 | 7/1985 | Japan . |
| 60-254963 | 12/1985 | Japan . |

OTHER PUBLICATIONS

DesignCAD 2–D, Version 5.0, Will Schleter, PC Magazine, v10, n21, p. 245(2), Dec. 1991.

"WordPerfect 5.1 for Windows Ships", WordPerfect Corp., Product Release, File 621, Dialog, Nov. 1991.

*Primary Examiner*—Paul R. Lintz
*Assistant Examiner*—Hosain T. Alam
*Attorney, Agent, or Firm*—Staas & Halsey

[57] ABSTRACT

A function designate method for designating a variety of functions to be performed by a control unit. The method includes the step of displaying graphic icons under ordinary circumstances, which are for designating a variety of functions to the control unit on a display device. The method further includes displaying character icons, each of which includes one of the graphic icons and one character for designating a key on a keyboard, when a predetermined control key has been pressed. Also, the method includes a graphic icon by a cursor or simultaneously pressing the control key and a key corresponding to a character displayed together therewith. Finally, the method includes designating a function that has been allocated to the graphic icon to the control unit.

2 Claims, 21 Drawing Sheets

FIG. 5

| ITEM NAME (DATA NAME) | NUMBER OF CHARACTERS (MAXIMUM DATA LENGTH) | ATTRIBUTES (NATURE OF DATA) |
|---|---|---|
| EMPLOYEE NUMBER | 10 | NUMERICAL VALUE |
| FURIGANA | 20 | HALF-SIZE KANA CHARACTER STRING |
| NAME | 20 | FULL-SIZE KANA CHARACTER STRING |
| SEX | 10 | FULL-SIZE KANA CHARACTER STRING |
| BIRTHPLACE | 20 | FULL-SIZE KANA CHARACTER STRING |
| PRESENT LOCATION | 60 | FULL-SIZE KANA CHARACTER STRING |
| TELEPHONE NUMBER | 20 | TELEPHONE NUMBER |
| RECRUITMENT DATE | 8 | DATE; FULL-SIZE CHARACTER STRING |
| LAST SCHOOLING | 20 | FULL-SIZE KANA CHARACTER STRING |
| QUALIFICATIONS | 20 | FULL-SIZE KANA CHARACTER STRING |
| POST | 30 | FULL-SIZE KANA CHARACTER STRING |
| NAME OF COMPANY IN CHARGE | 30 | COMPANY NAME ; CHARACTER STRING |
| OPERATING BUDGET | 10 | NUMERICAL VALUE w. COMMAS |

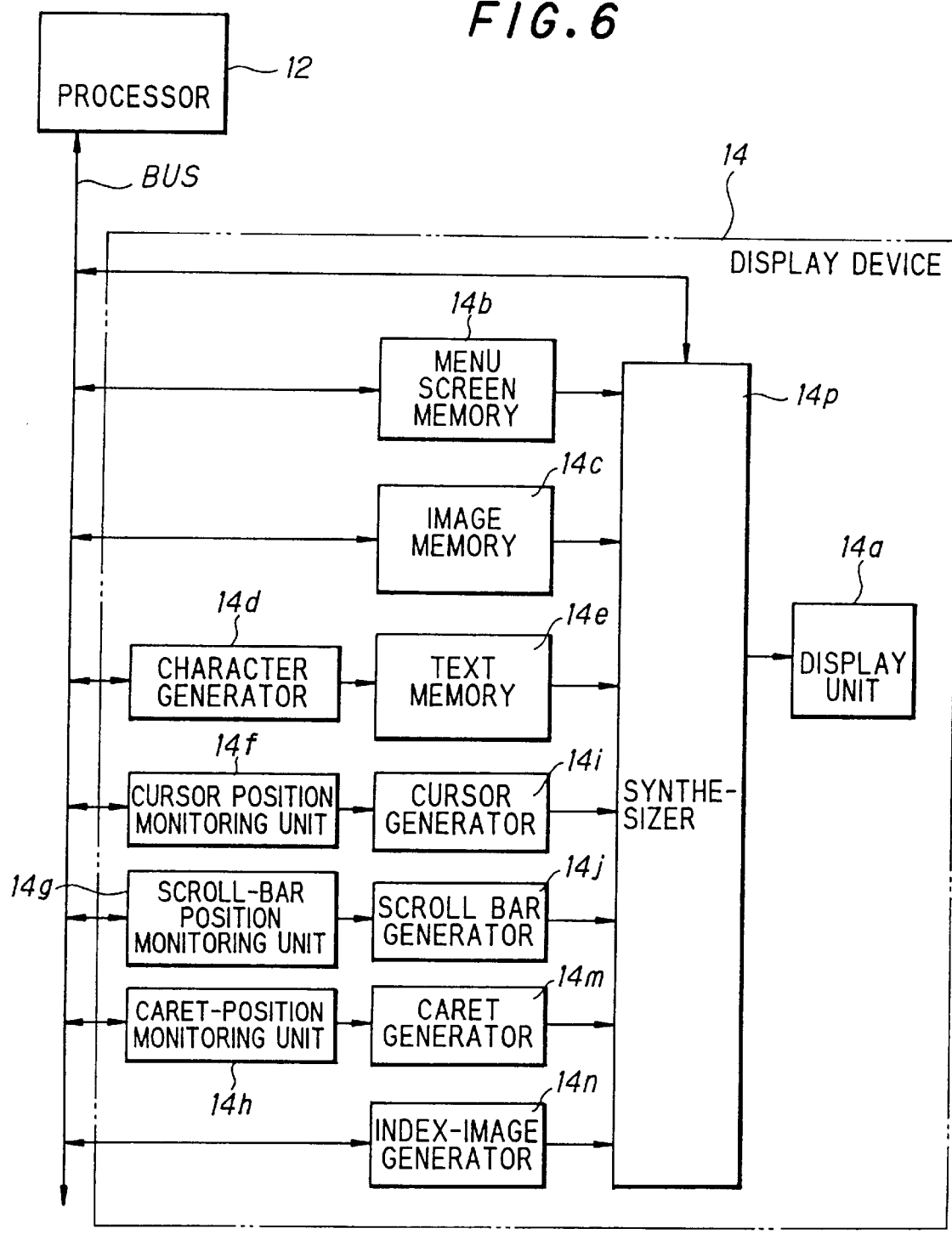

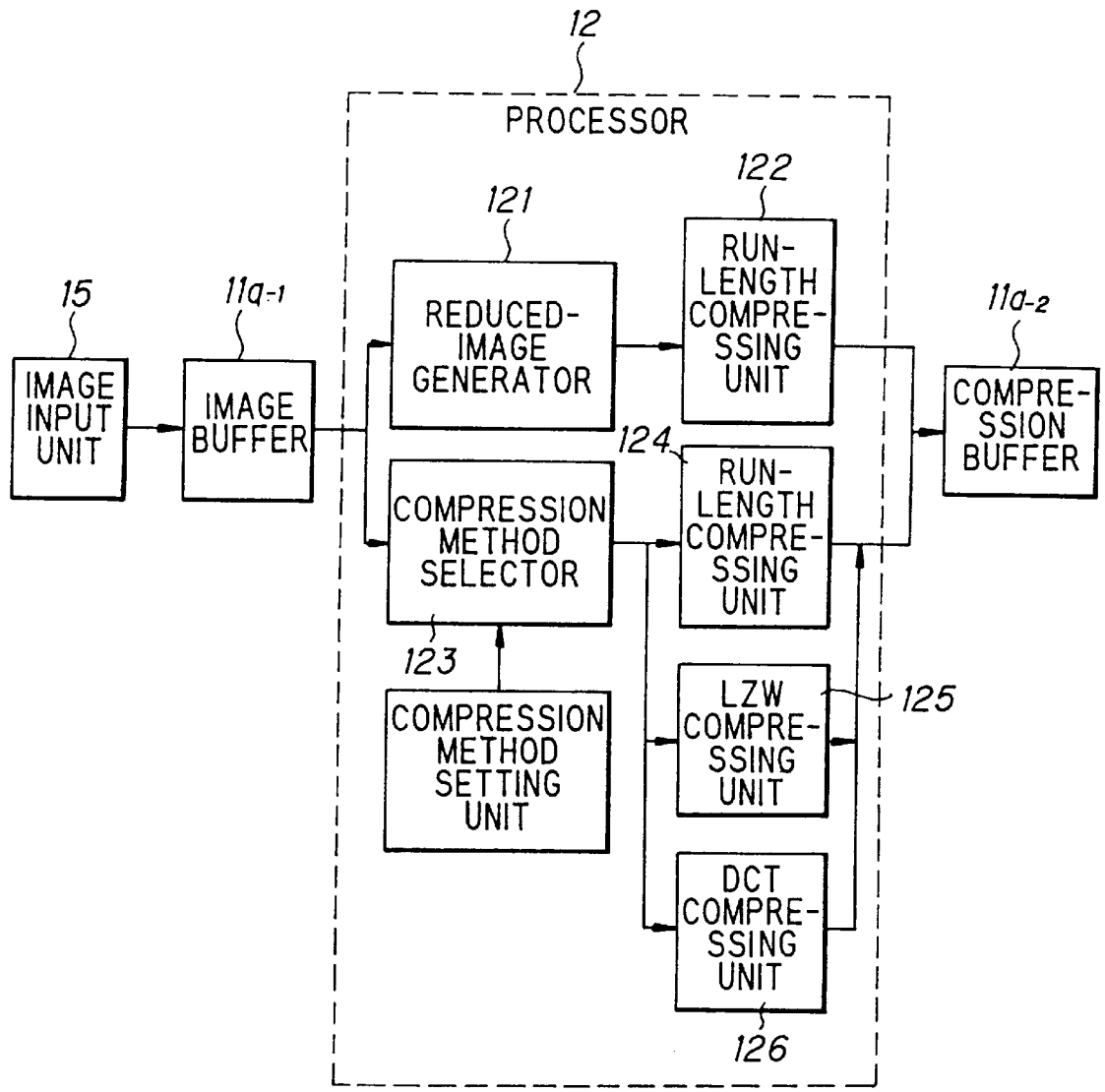

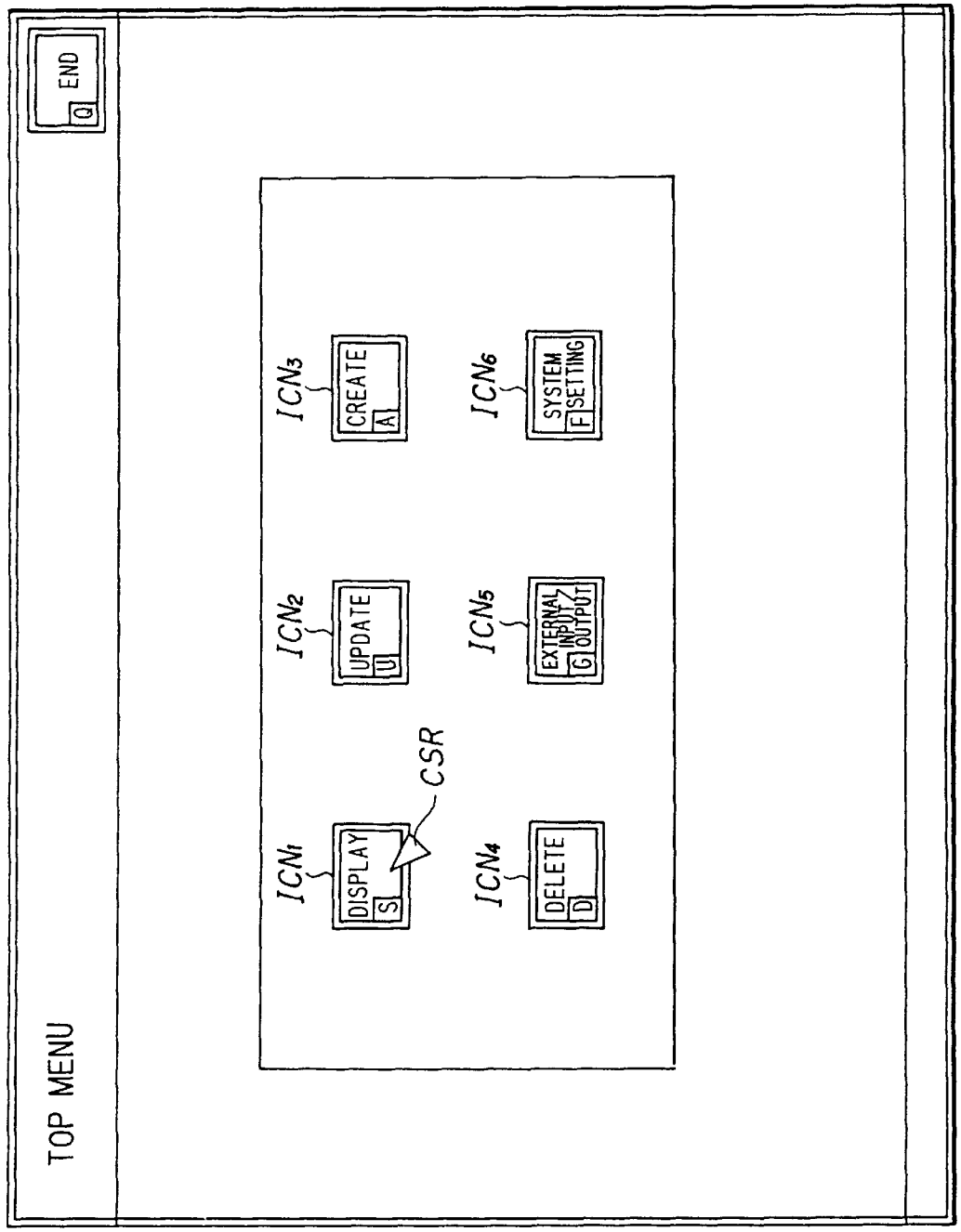

FIG. 19

CARD DISPLAY

[NEXT N CARD] [PREVIOUS B CARD] [TELE- T PHONE] [UPDATE U CARD] [PRINT G SCREEN] [PRINT P] [CARD F FORM] [END Q]

PAGE 1

| EMPLOYEE NUMBER | 123456 |
|---|---|
| FURIGANA | INOUE AKIRA |
| NAME | INOUE AKIRA |
| SEX | MALE |
| BIRTHPLACE | MIYAZAKI PREFECTURE |
| PRESENT LOCATION | 4-1-13 TOYO, KOTO-KU TOKYO |
| TELEPHONE NUMBER | 03-3615-4727 |
| RECRUITMENT DATE | OCTOBER 1, 1991 |
| LAST SCHOOLING | COLLEGE GRADUATE |
| QUALIFICATIONS | THIRD GRADE |
| POST | DEVELOPMENT DEPARTMENT |

IMAGE 1

[ON (1)] [OFF (2)] [SPRIT (3)]

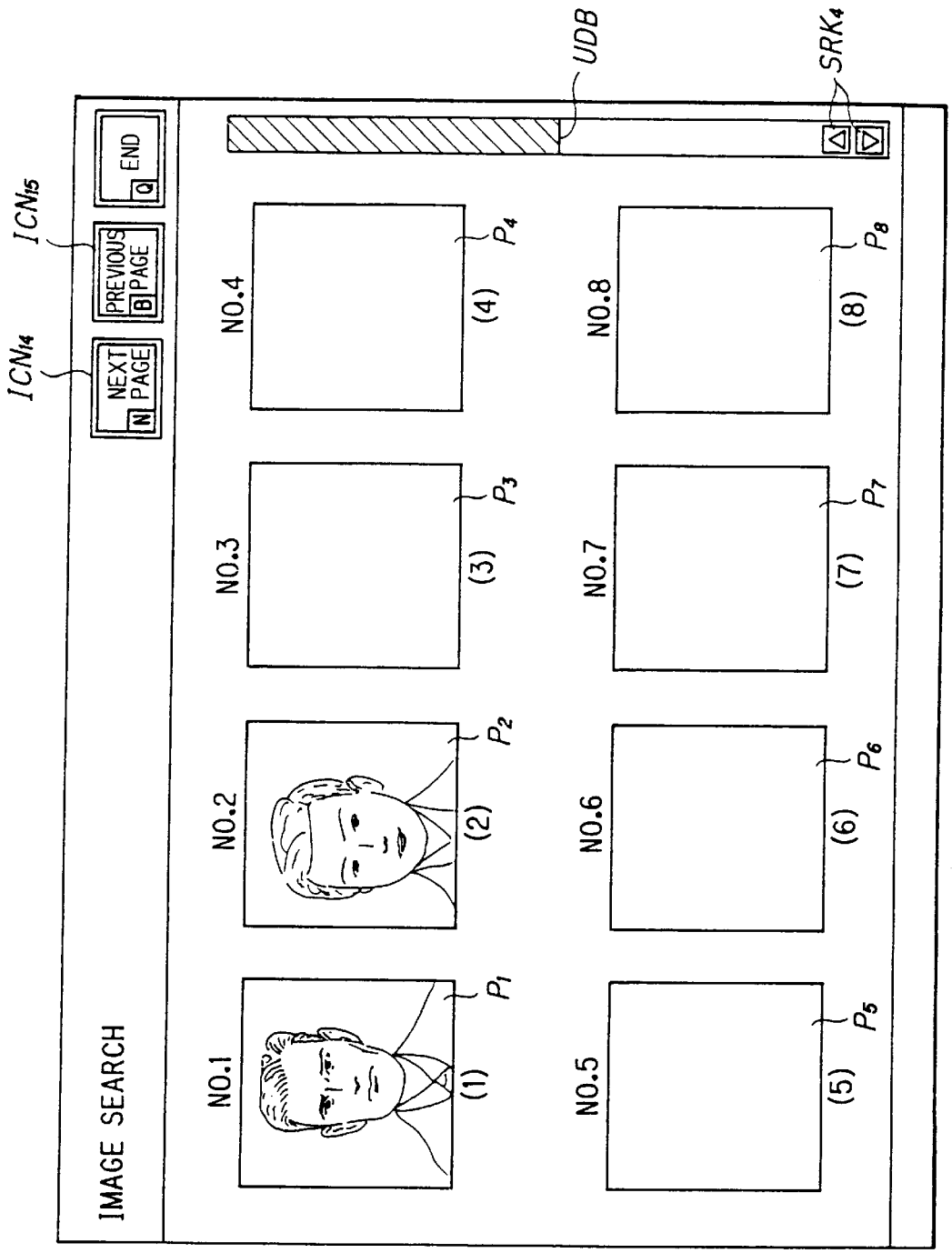

FUNCTION DESIGNATE METHOD FOR DESIGNATING A VARIETY OF FUNCTIONS TO BE PERFORMED BY A CONTROL UNIT

This application is a division of application Ser. No. 07/997,930, filed Dec. 29, 1992, now U.S. Pat. No. 5,553, 277.

BACKGROUND OF THE INVENTION

This invention relates to an image search method for searching and retrieving a desired image from a memory device which stores a number of images and displaying the retrieved image on a display device.

It has become very popular in recent years to have computers execute image management of such images as photographs and drawings. In an image management system of this kind, still images such as photographs and drawings are stored in large quantity on a magnetic disk, optical disk or photomagnetic disk, a desired image is retrieved as needed and the retrieved image is displayed on a display device.

Methods available for the search and retrieval of a desired image include a method through which still images are searched one at a time and a method through which the search is performed by displaying a list of titles assigned to respective ones of the still images. With the method of searching for frames one by one, however, problems are encountered in that this method leads to operator eye fatigue and has a low search speed. With the method of search and retrieval from a title list, the images cannot be searched while being observed. Consequently, the accuracy of search is poor and the search is difficult to perform. These shortcomings shall be referred to as a first problem hereinbelow.

Magnetic disks, optical disks, photomagnetic disks and the like are large-capacity storage devices. However, since approximately 130 kilobytes are required in order to store a single image, these disks are incapable of storing a large quantity of images. This shall be referred to as a second problem.

In order to solve the first problem, an image search method has been proposed in which images $3_1$, $3_2$, ... reduced in size and then combined are stored on a video disk 1 in advance, as shown in FIG. 1. Each of the images $3_1$, $3_2$, ... is obtained by combining m-number (16, for example) of original images $2_1$, $2_2$, $2_3$, ... $2_s$ in horizontal and vertical directions upon reducing them in size to ¼ in each of these directions. At the time of search, the reduced and combined images $3_1$, $3_2$, ... are displayed successively on the display device, a desired image is found and designated among the reduced and combined images, and the designated original image is displayed on the display device. In accordance with this method of search, an advantage over the conventional methods is that a high-speed search can be performed while the images are being displayed.

However, searching speed is only about 16 times as fast as a single-frame search. This means that in a case where a large number of images, e.g., 1600, have been stored, the reduced and combined images must be displayed 100 times in a worst-case situation. The images reduced to 1/16 must be viewed one at a time, and if the desired image is not found, then the image search must be performed in a similar manner upon displaying the next group of reduced combined images. As a result, the problem of operator eye fatigue is still encountered. Thus, there are limitations upon the method of FIG. 1 in a case where a large number of images are stored on a disk.

In order to solve the second problem, an image filing apparatus has been proposed in which the original images and the images that have been reduced and combined are both stored on a disk upon being subjected to compression coding, after which images are restored at the time of display. However, the same compression coding method is used for the original images and for the reduced and combined images. Consequently, when image compression is performed by high-compression coding, the memory capacity required in order to store the images can be decreased but the reduced and combined images cannot be restored and displayed at high speed at the time of image retrieval. As a result, search time is prolonged.

SUMMARY OF THE INVENTION

Accordingly, an object of the present invention is to provide an image search method in which a desired image can be searched and retrieved at high speed and accuracy, while the images are being observed, even in a case where the images have been stored in a memory device such as an optical disk in a large quantity.

Another object of the present invention is to provide an image search method in which images can be stored in large quantity and search images, which are images that have been reduced and combined, can be displayed at high speed.

A further object of the present invention is to provide an image search method which exhibits excellent operability.

According to the present invention, the foregoing objects are attained by providing an image search method which comprises a step of forming one unit of image/text information from image information that is for displaying N-number of images (where N is any integer of a predetermined value or less) and text information, and forming a data base by storing a number of items of the image/text information in a memory device, a step of retrieving one or more items of image/text information, which satisfy search conditions, from the data base by referring to text information of all of the image/text information when the search conditions have been inputted, a step of reducing and combining each of the images in the image/text information retrieved and displaying the reduced and combined images that have been obtained on a display device, and a step of selecting a desired item of image/text information from the reduced and combined images and displaying the selected item of information on the display device.

In accordance with the search method of the present invention, it can be arranged so that only images which satisfy search conditions are adopted as images that are the subject of a search. Moreover, since desired images need only be searched among reduced and combined images obtained by reducing and combining only images that are the subject of a search, the desired images can be searched at high speed and accuracy while they are observed by the operator.

Further, according to the image search method of the invention, original-image information and reduced-image information obtained by reducing the original images are provided as a set and serve as the image information. With such an arrangement, the reduced and combined images can be generated and displayed at high speed using the reduced-image information, and desired images can be retrieved at high speed.

Further, according to the image search method of the invention, the data base is formed by compressing the reduced-image information using a compression method capable of high-speed restoration, storing the compressed information in the memory device, compressing the original-image information by a prescribed compression method from among a plurality of compression methods, and storing the compressed information in the memory device. With such an arrangement, images can be stored in large quantity and the reduced-image information can be restored at high speed. Accordingly, the reduced and combined images can be generated and displayed at high speed and the desired images can be retrieved at high speed.

Further, according to the image search method of the invention, the size of a page designating index can be changed in dependence upon the number of pages, and the reduced images of all images of one item of image/text information can be combined and displayed en masse and displayed in enlarged form, thereby making it possible to improve operability.

Further, according to the image search method of the invention, graphic icons for designating a variety of functions are displayed on the display device, characters which designate keys on a keyboard are displayed in combination with the graphic icons, and either a graphic icon is designated by a cursor or a predetermined control key and a key corresponding to a character among the characters displayed together with the icons are pressed simultaneously, whereby a function that has been allocated to the icon is implemented. This makes it possible to readily enter a function from a keyboard as well to improve operability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram for describing items of text information;

FIG. 6 is a block diagram showing a display device;

FIG. 7 is a block diagram showing an arrangement for compressing and then storing images inputted from an image input unit;

FIG. 9 is a diagram for describing a top-menu screen;

FIG. 10 is a diagram for describing icons, in which

FIG. 19 is a card display and search screen for displaying a retrieved card;

FIG. 20 is a card display and search screen displayed at the time of an image search.

DESCRIPTION OF THE PREFERRED EMBODIMENT (a) General Description

Figure 1:
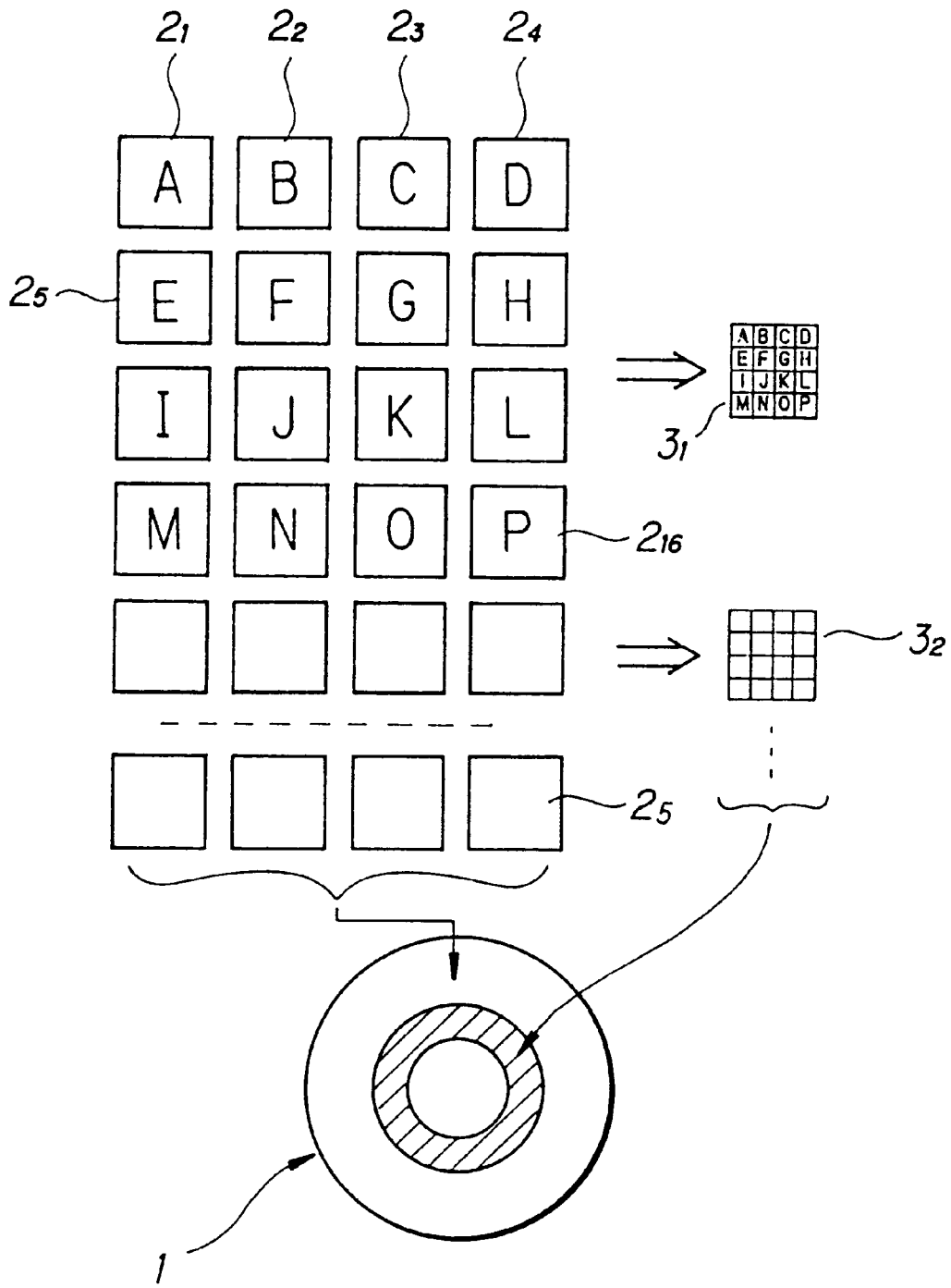
FIG. 1 is diagram for describing an image search method according to the prior art.
Figure 2:
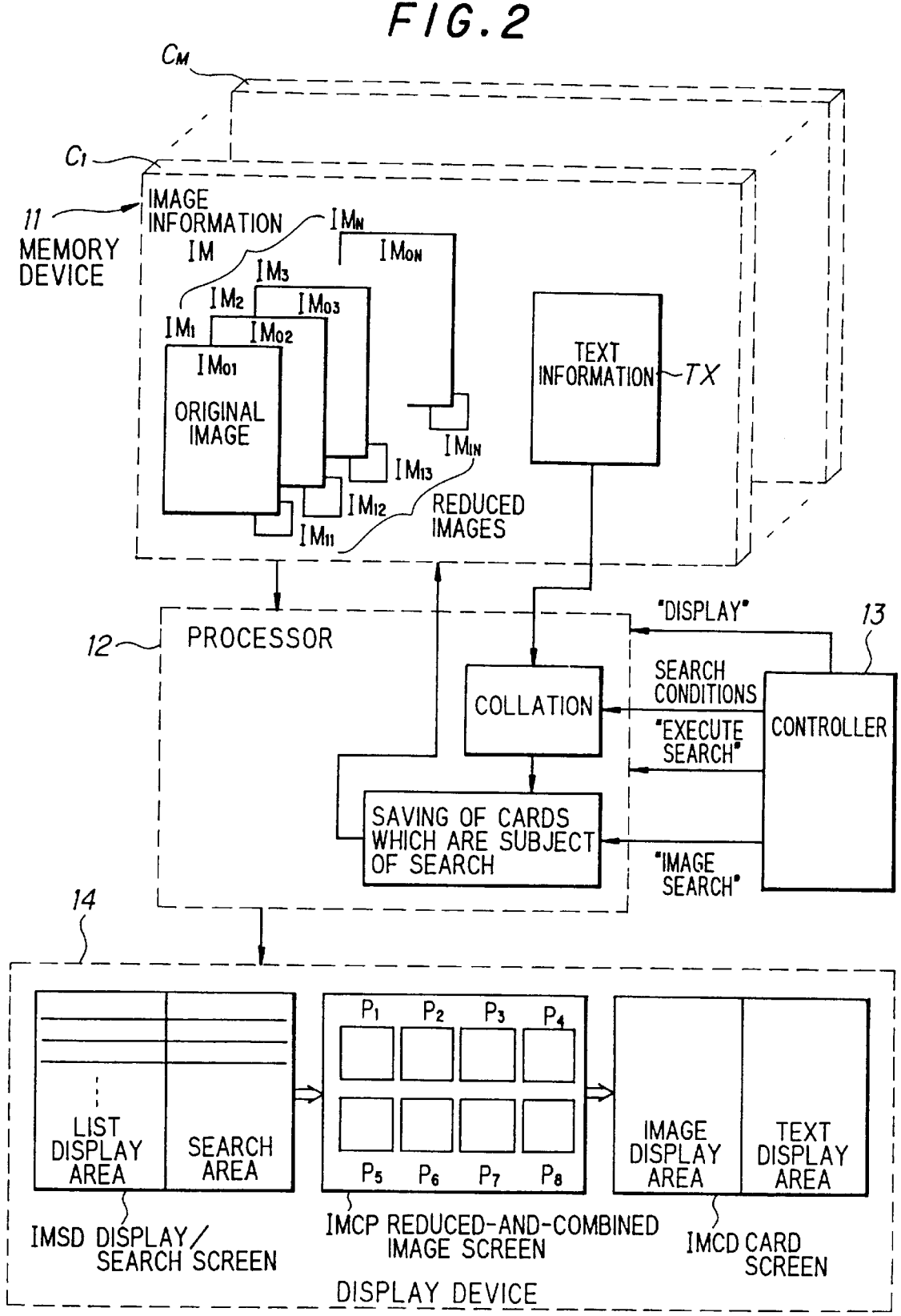
FIG. 2 is a diagram for describing an overview of the present invention.

FIG. 2 is a diagram for describing an overview of the present invention.

As shown in FIG. 2, numeral 11 denotes a memory device such as a magnetic disk, an optical disk or a photomagnetic disk. $IM_1$–$IM_N$ represent items of image information, and TX represents text information. The items of image information $IM_1$–$IM_N$ respectively include items of original-image information $IM_{O1}$, $IM_{O2}$, $IM_{O3}$, . . . $IM_{ON}$ and items of reduced-image information $IM_{11}$, $IM_{12}$, $IM_{13}$, . . . $IM_{1N}$ obtained by reducing the size of the original images. Each item of original-image information and its corresponding items of reducing-image information form a set. One unit of image/text information (hereinafter referred to as a "card") $C_1$ is formed from N-number of the items of image information $IM_1$–$IM_N$ (where N is any integer of 16 or less, by way of example) and the text information TX. An image data base is constructed from a number of cards $C_1$–$C_M$. By way of example, in case of a data base for personnel management, one card is created for each employee. The card is constituted by N-number of items of photographic image information IM, such as frontal and side photographs of the employee's face and a full-body photograph of the employee, and the text information TX, such as employee number, name, sex, birthplace, address, post and qualifications. The image data base is composed of cards of all employees. In case of a data base for tourist information, a card is created for every tourist location, and each card is composed of N-number of photographic images and text regarding sightseeing locations. Other examples of image data bases are those for managing housing information, used-car information and commodity information, etc.

Numeral 12 denotes a processing unit constituted by a computer for controlling the overall system, 13 a controller such as a mouse or keyboard, and 14 a display device.

In a case where a desired image is retrieved from a data base, "DISPLAY" is selected on an initial screen (a top-menu screen) by the controller 13, whereupon the processor 12 causes a display/search screen IMSD to be displayed on the display device 14.

The left side of the display/search screen IMSD is a list display area, in which a list of all cards (namely a list of character strings each of which is composed of a prescribed number of the characters at the beginning of text information) is displayed. Ordinarily, the list of all cards cannot be displayed to fit on one screen but can be viewed by performing a scrolling operation or the like. The right side of the display/search screen IMSD is a search area for displaying search items and search conditions (keywords and numerical ranges).

When search conditions are set from the controller 13 for every prescribed item constituting the text information, these search conditions are displayed in the corresponding item space. After the search conditions have been inputted for each item, the controller 13 is used to set the search in accordance with the logical product (AND) or logical sum (OR) of the search conditions. If "EXECUTE SEARCH" is inputted after this setting is made, the processor 12 collates the text information of each card and the search conditions, finds the cards which satisfy the search conditions and saves the found cards in an internal memory. Further, the processor 12 causes a list solely of the cards which satisfy the search conditions to be displayed in the list display area.

By virtue of the foregoing operation, the cards which are the subject of a search can be narrowed down. Thereafter, search conditions can be inputted if necessary to narrow down further the cards which are the subject of a search.

"RETRIEVE IMAGE" is inputted using the controller 13 when the narrowing-down operation ends. As a result, the processor 12 uses the reduced-image information $IM_{11}$ to generate a reduced image of the first page of each card which is the subject of a search saved by the narrowing-down operation, and causes the display device 14 to display a reduced-and-combined image screen IMCP, which is obtained by combining M-number (where M=8, by way of example) of images $P_1-P_8$ that have been reduced in size. The operator glances at the reduced-and-combined image screen IMCP and looks for the desired image. If the desired image is not found, the screen is scrolled until the desired image comes into view. If the desired image comes into view, then this image is designated by the controller 13.

When a card has been selected by designating the desired image, the processor 12 causes the display device 14 to display a card display screen IMCD containing the image of the first page of the card and the text information of the first page. The left side of the card display screen IMCD is an image display area, and the right side is a text display area. The image displayed in the image display area can be turned over to display the next image by being designated using the controller. Moreover, the image can be enlarged and all of the images contained on the card can be reduced and combined and displayed en masse (i.e., a multiple-image display can be presented). Similarly, the text information displayed in the text display area can be turned over to display the next item of text by being designated using the controller.

(b) Configuration of Image Data-Base System

Figure 3:
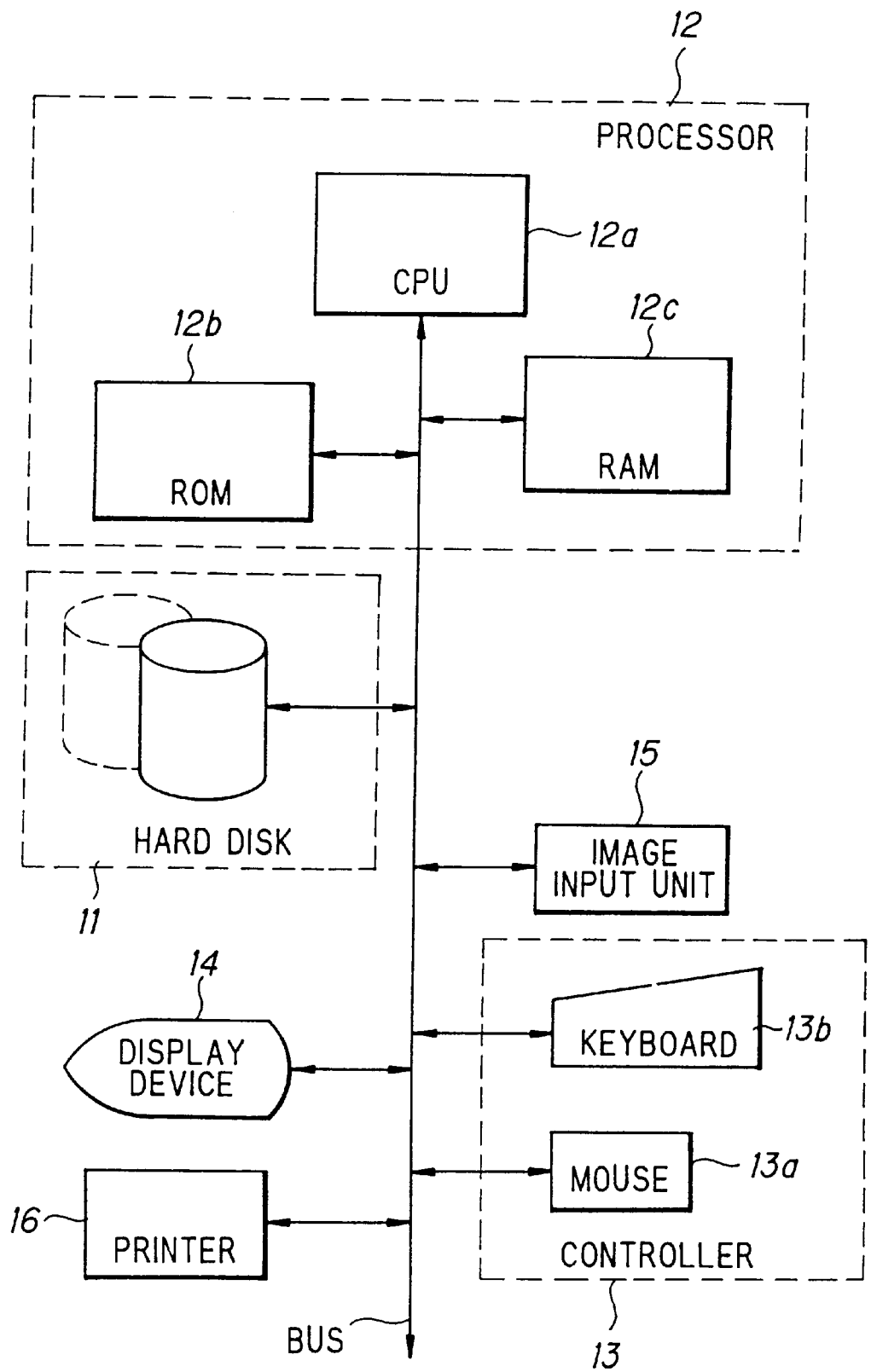
FIG. 3 is a block diagram showing an image database system according to the present invention.

FIG. 3 is a block diagram showing the image database system according to this invention. The memory device 11, which stores a plurality of cards (image/text information), may be a hard disk, for example. A plurality of such memory devices are capable of being connected and the number thereof is capable of being increased. The processor 12 constituted by the computer for controlling the overall system is constituted by a CPU 12a, a ROM 12b for storing various control programs and the like, and a RAM 12c.

The controller 13 is equipped with a mouse 13a and a keyboard 13b. The display device 14 displays screens which conform to a variety of functions. Numeral 15 denotes an image input unit, and numeral 16 designates a printer for printing images and items of text.

Hard Disk

The hard disk 11 has an image work area 11a, a menu-screen storage area 11b, and a card storage area 11c. The image work area 11a temporarily stores images inputted at the time of card creation, the menu-screen storage area 11b stores a number of menu screens such as the initial screen, the display/search screen and a card creation screen in advance, and the card storage area 11c stores a number of cards $C_1, C_2, C_3, \ldots$ One card is composed of the image information IM and the text information TX. The image information IM has a maximum of 16 image files $IM_1-IM_N$ ($N \leq 16$). The image files $IM_1-IM_N$ respectively have (1) headers $HD_1-HDN$, (2) items of original image information $IM_{01}-IM_{0N}$, and (3) items of reduced-image information $IM_{11}-IM_{1N}$, which are obtained by reducing the original images, in which (1), (2) and (3) constitute a set. Each header describes the attributes (e.g., the number of colors) of the image, the size of the image (original image or reduced image), the method of image compression, and the address of the image in the file, etc. By referring to the header, the reduced image and the original image can each be read out and restored independently.

In the case of a data base for personnel management, one card $C_i$ (i=1, 2, 3, . . . ) is created for each employee. Each card is constituted by image information IM, such as frontal and side photographs of the employee's face and a full-body photograph of the employee, and the text information TX, such as employee number, name, etc. The image information IM has image files $IM_1, IM_2, IM_3$ for the frontal, side and full-body photographs, for example, and each image file has the original image, the reduced image, which possesses dimensions ¼ of those of the original image in both the vertical and horizontal directions, and the header. The text information TX possesses information conforming to a number of items ITM shown in the leftmost column of FIG. 5. It is required that the information of each item be expressed by no more than the number of characters shown in the center column and by the type of characters indicated in the rightmost column.

Display device

As shown in FIG. 6, the display device 14 includes a display unit 14a such as a CRT or liquid-crystal display panel, a menu screen memory 14b for storing menu screen, an image memory 14c for storing a prescribed image (referred to as a "card image") of a card, a character generator 14d for generating character information based upon text information, a text memory 14e for storing text images composed of a number of character images, a cursor position monitoring unit 14f for monitoring the position of a mouse cursor, a scroll-bar position monitoring unit 14g for monitoring the up-down and left-right positions of scroll bars, a caret-position monitoring unit 14h for monitoring the position of a caret, a cursor generator 14i for generating a cursor image, a scroll-bar generator 14j for generating up-down and left-right scroll-bar images, a caret generator 14m for generating a caret image, an index-image generator 14n for generating an index image (described later) conforming to the number of pages, and a synthesizing unit 14p for combining images in an appropriate fashion and displaying them on the display unit 14a. Though not shown, the display device 14 has a multiwindow function as well.

The menu screen memory 14b and the image memory 14c respectively store a menu screen and a card image entered from the processor 12 and input their stored contents to the synthesizing unit 14p successively in accordance with raster scanning. The character generator 14d generates character images based upon text information entered from the processor 12, and the text memory 14e stores the character images, namely the text images, and inputs the stored contents to the synthesizing unit 14p successively in accordance with raster scanning. The cursor position monitoring unit 14f updates the position of the mouse cursor based upon rotation of a track ball in the mouse 13a, and the cursor generator 14i generates the cursor image at the cursor position. The scroll-bar position monitoring unit 14g updates the up-down and left-right scroll-bar positions in dependence upon up-down and left-right scrolling operations, and the scroll-bar generator 14j generates horizontal and vertical scroll-bar images that extend up to the aforesaid positions. The caret-position monitoring unit 14h updates the caret position in dependence upon a caret moving operation and generates a caret image at this position. The index image generator 14n displays N-number of indices for turning pages in the vicinity of the image area and text area. The size of the index is larger the smaller the value of N.

Image Input Unit

The image input 15 is an image scanner or video camera, by way of example. FIG. 7 is a block diagram showing an arrangement for compressing and then storing images inputted from the image input unit 15. In actuality, each component of the processor 12 is implemented by software.

An original image inputted from the image input unit 15 is held in an image buffer 11a-1 within the image work area 11a of the hard disk. When "EXECUTE REGISTRATION" is subsequently designated from the controller 13, a reduced-image generator 121 of the processor 12 reduces the size of the original image to ¼ in both the horizontal and vertical directions by thinning-out processing or the like, and the resulting data is inputted to a run-length compressing device 122. The latter subjects the reduced image to run-length compression and stores the compressed data in a compression buffer 11a-2 within the image work area 11a. Next, a compression-method selector 123 inputs the original image to a compressing device (a run-length compressing device 124, an LZW compressing device 125, a DCT compressing device 126) which conforms to an initially preset compression method (run-length compression, LZW compression, DCT compression). The compressing device to which the original image has been applied compresses the image in accordance with a prescribed compression method and stores the compressed image in the compression buffer 11a-2. Finally, the reduced image and the compressed data obtained by compressing the original image are stored in the card storage area of the hard disk upon having a header assigned thereto.

Various Compression Methods

The run-length compression method compresses data by representing an image by a pattern and its continuous numbers. The rate of compression is low but high-speed restoration is possible. Accordingly, the reduced images $IM_{11}$–$IM_{1N}$ can be compressed by run-length compression and the reduced and combined image screen IMCP (see FIG. 2) can be displayed in a short period of time.

The LZW compression method compresses data using an LZW (Lempel-Ziv-Welch) code (see T. A. Welch, "A Technique for High-Performance Data Compression", Computer, June 1984). If one word of data is referred to as a character and data composed of an arbitrary series of words is referred to as a character string, then the LZW compression method is one in which a newly input character string is registered in a dictionary upon being assigned a number in the order of appearance, and a character string currently being inputted is coded by being represented solely by the dictionary number of the longest coincident character string that has been registered in the dictionary. In accordance with the LZW compression method, the advantages are that a high compression rate is obtained and the original image can be reproduced in an accurate manner. However, a drawback is that a comparatively long period of time is required for restoration.

According to the DCT compression method, the original image is partitioned in a block comprising 8×8 pixels, for example, the picture signal of each block is converted into DCT coefficients of a spatial frequency distribution by a two-dimensional discrete cosine transform, the DCT coefficients are quantized by threshold values which conform to vision, and coding is performed by a Huffman table in which the quantized DCT coefficients obtained are statistically determined. In accordance with the DCT compression method, an advantage is that coding can be performed at the highest possible efficiency. However, the disadvantages are that the restoration speed is low and the original image cannot be reproduced in exactly the same way. Which method is used to compress the original image is initially preset upon taking the specific character of each method into consideration.

(c) Functions of Image Data-Base System

Functions

In the image data-base system, the image data base is constructed by creating a number of cards (items of image/text information) and storing these cards in a memory device. Desired cards are searched and retrieved from the image data base as necessary and the retrieved cards are displayed. Furthermore, the contents of cards may be updated or deleted.

Figure 8:
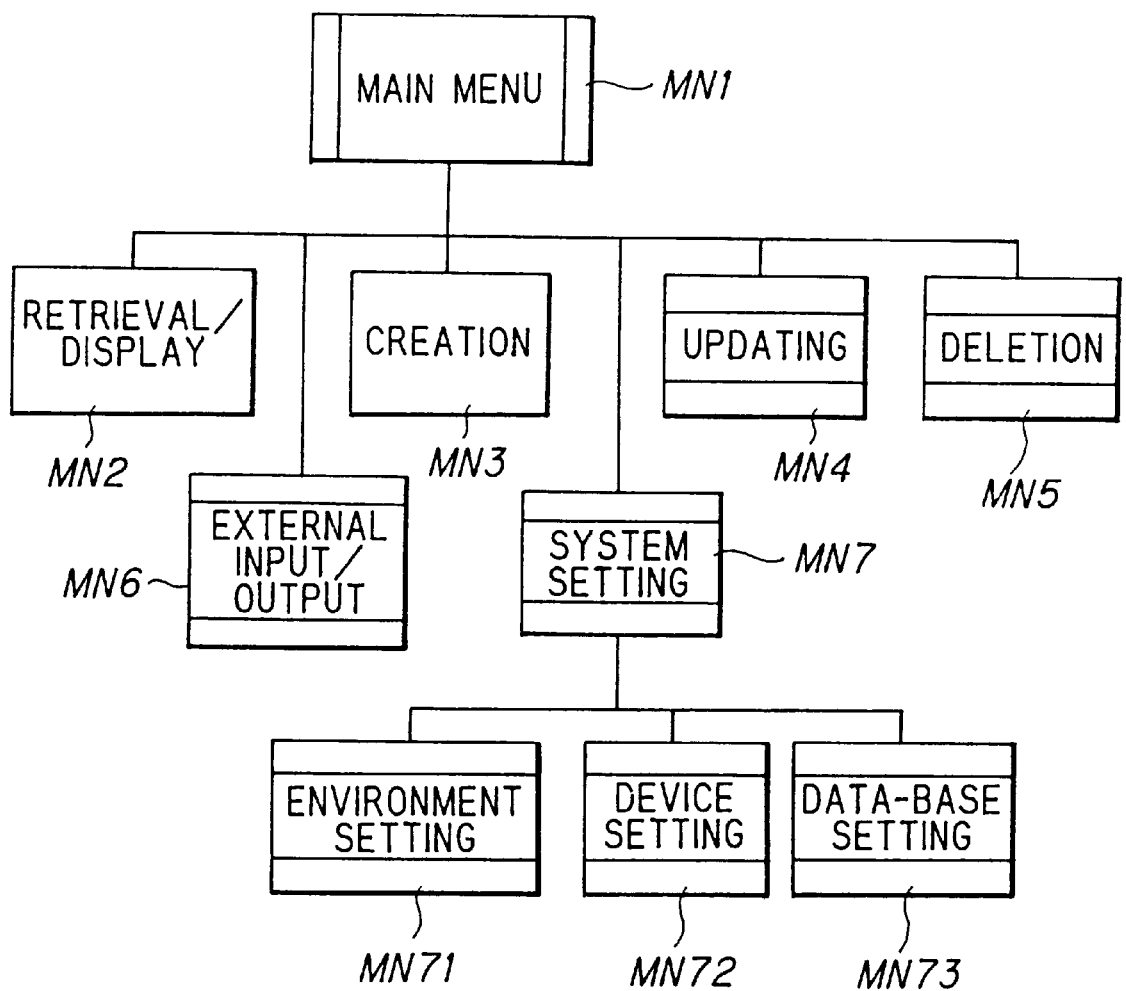
FIG. 8 is a block diagram showing each of the functions of an image data base.

FIG. 8 is a block diagram showing each of the functions of the image data base. MN1 denotes a main menu MN1 for managing a retrieval/display menu MN2, a creation menu MN3, an updating menu MN4, a deletion menu MN5, an external input/output menu MN6 and a system setting menu MN7.

Cards already registered are retrieved and displayed using the retrieval/display menu MN2, a card composed of image information and text information is newly added and registered using the creation menu MN3, the image and text items on a card already registered are changed using the updating menu MN4, and a card already registered is deleted using the deletion menu MN5. A card already registered can be backed up using the external input/output menu MN6, and the working environment, devices and data-base items of the image data-base system are set using the system setting menu MN7. An environment setting menu MN71 is used to set the management location of a text item and to add and delete management locations of an image file. A device setting menu 72 is used to set various types of input/output units used in the system, as well as method of connecting these units. A data-base setting unit 73 is used to set the attributes and lengths of text items, as well as search items.

Selection of Functions

When the image search system is started up, a top-menu screen illustrated in FIG. 9 is displayed on the display device 14. Functions are selected on the top-menu screen by designating icons $ICN_1$–$ICN_6$ which correspond to the various menus using a mouse cursor CSR, or by simultaneously pressing a control key and keys corresponding to the characters assigned to the icons $ICN_1$–$ICN_6$.

Figure 10A:
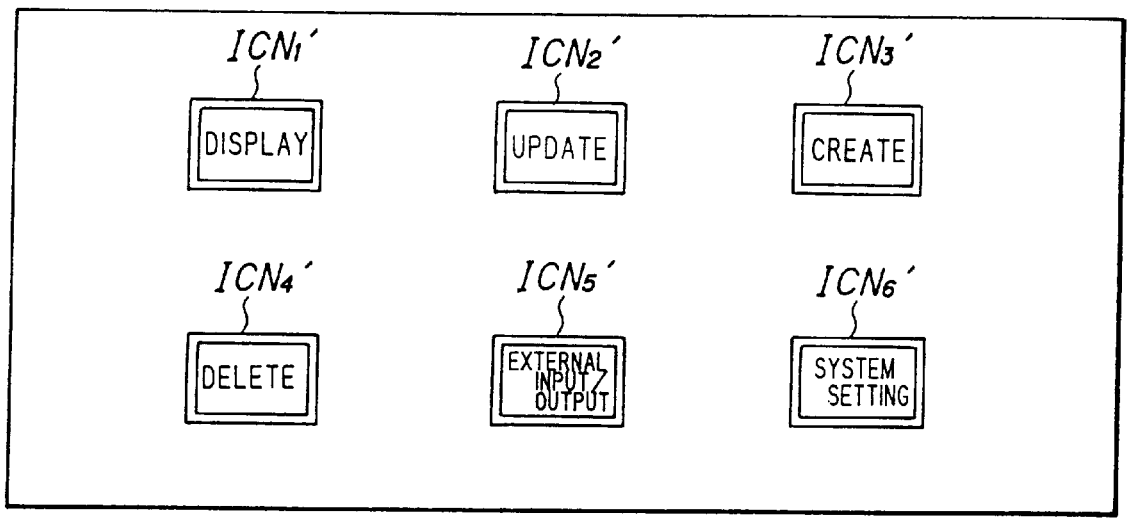
FIG. 10A is a diagram for describing graphic icons and FIG. 10B a diagram for describing character icons.
Figure 10B:
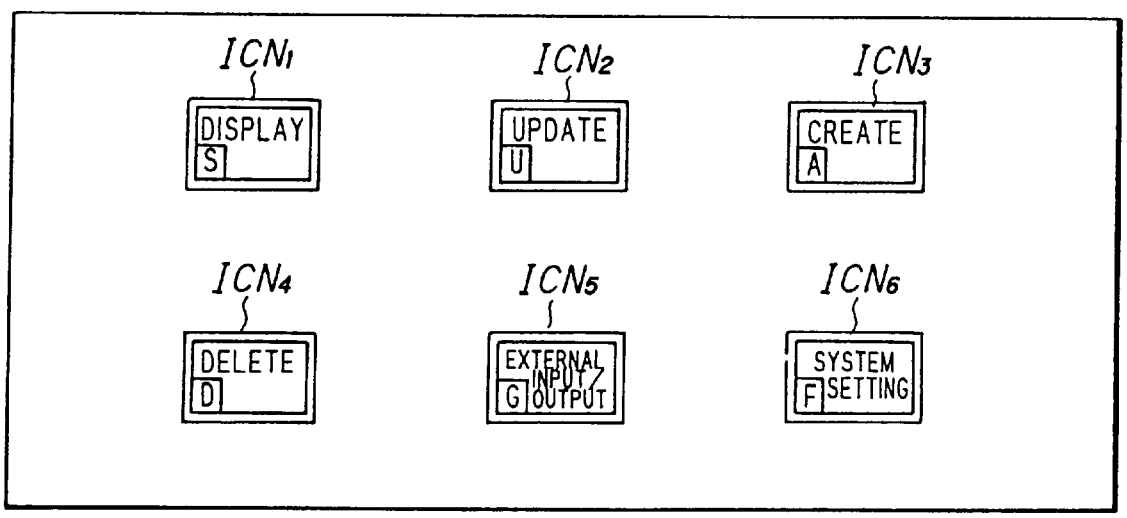

A key character can be displayed together with each icon at all times, as shown in FIG. 9. However, an arrangement can be adopted in which graphic icons $ICN_1'$–$ICN_6'$ without key characters are displayed in ordinary circumstances, as shown in FIG. 10A. Here the character icons $ICN_1$–$ICN_6$ with the key characters are displayed, as illustrated in FIG. 10B, only when the control key on the keyboard is pressed. The key that is to be operated is designated. In a case where a changeover is made between the graphic icons and the character icons, two types of menu screens, namely one having the graphic icons and one having the character icons, are stored in the menu-screen storage area 11b of the hard disk 11, and either of these two menu screens is selectively displayed depending upon whether the control is pressed or not.

Processing for creating and registering a card and a case in which a desired card is retrieved and displayed will now be described.

(d) Card Creation and Registration Processing

Figure 11:
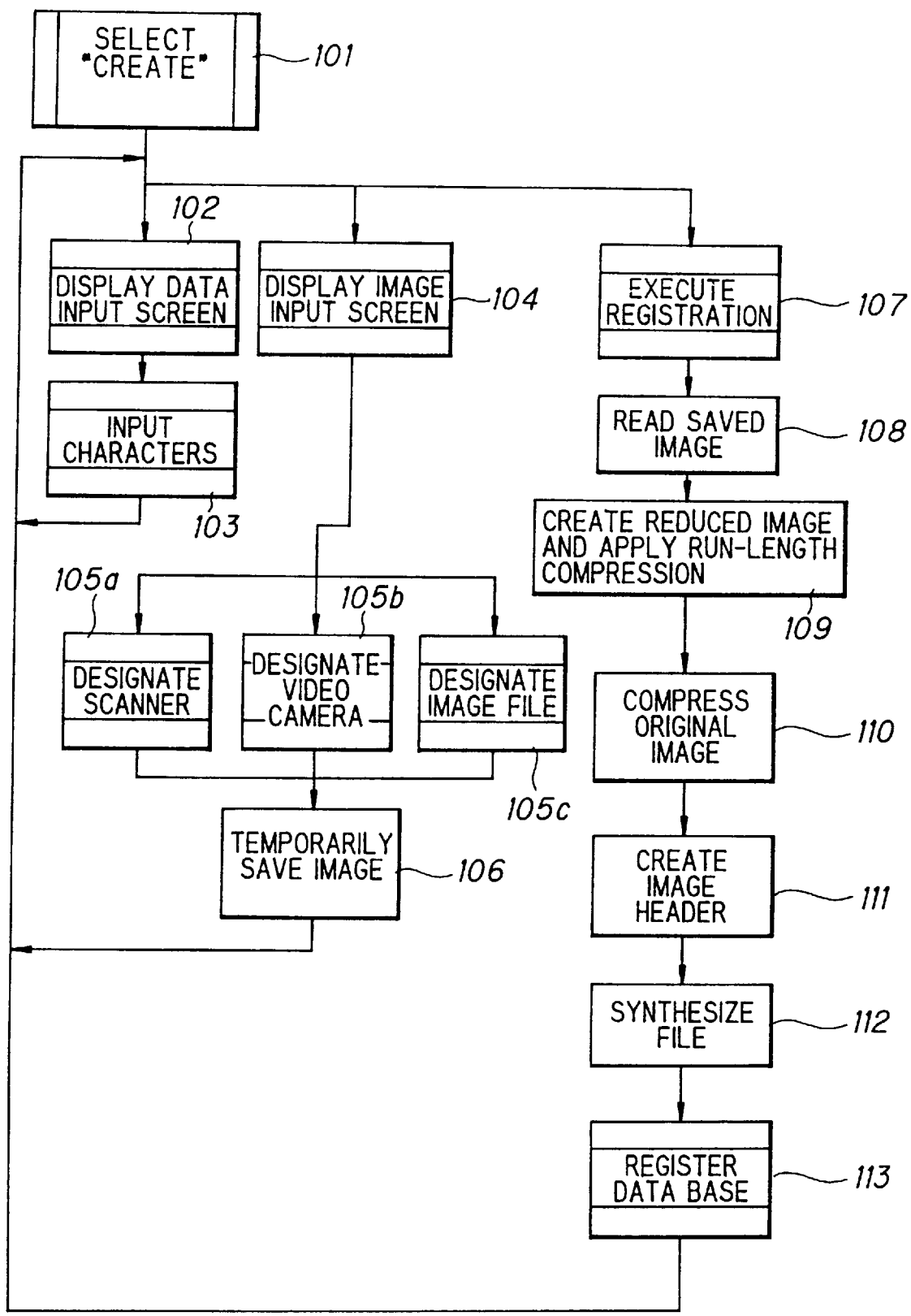
FIG. 11 is a flowchart illustrating card creation and registration processing.

FIG. 11 is a flowchart illustrating processing for creating and registering cards, and FIGS. 12 through 15 show examples of card creation screens. Processing for creating and registering cards will be described with reference to these drawings.

"CREATE" is selected at step 101 by designating the icon $ICN_3$ using the mouse cursor or keys in a state in which the top-menu screen (FIG. 9) is being displayed on the display device 14.

Figure 4:
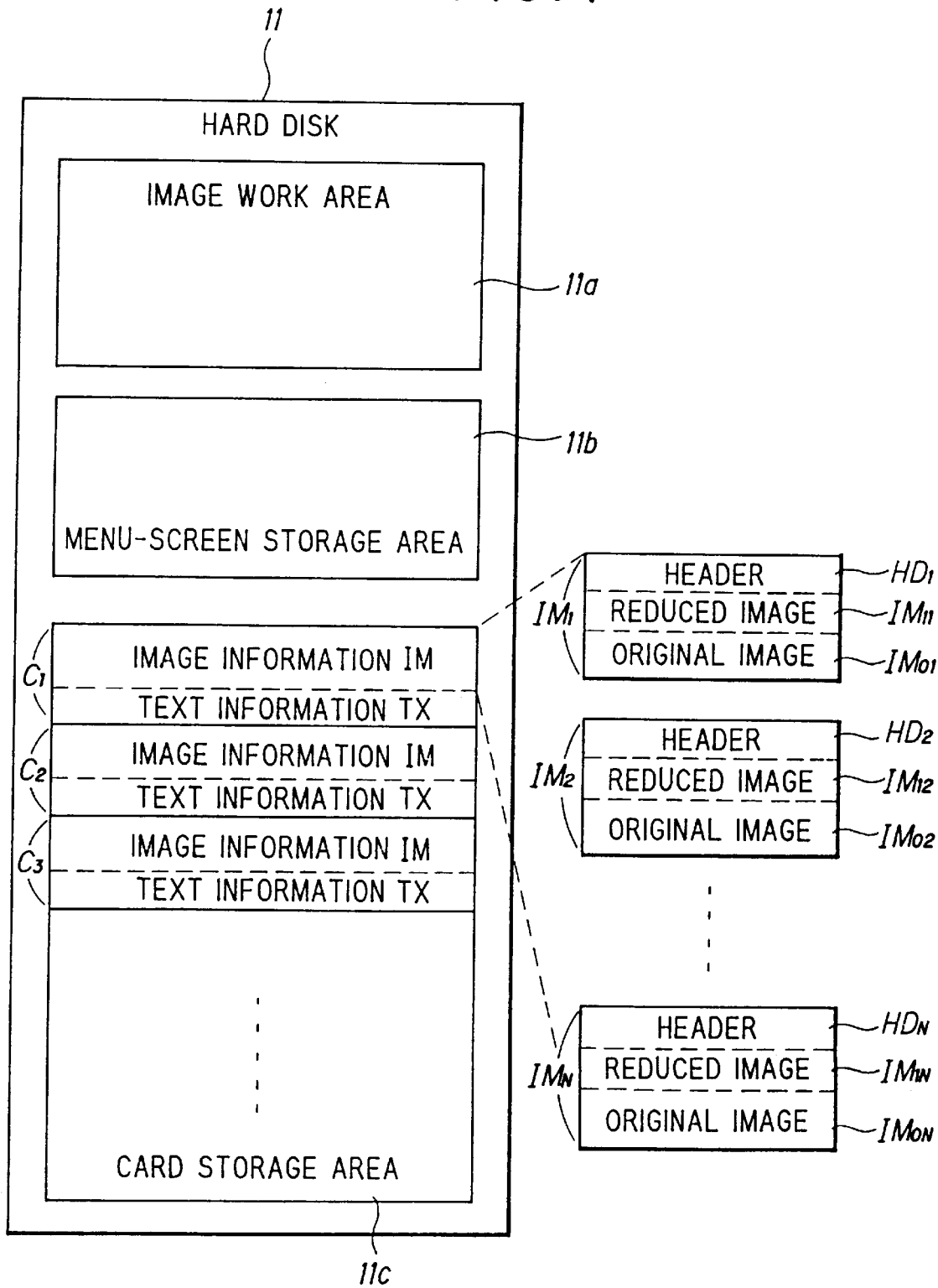
FIG. 4 is diagram for describing what is stored on a hard disk.
Figure 12:
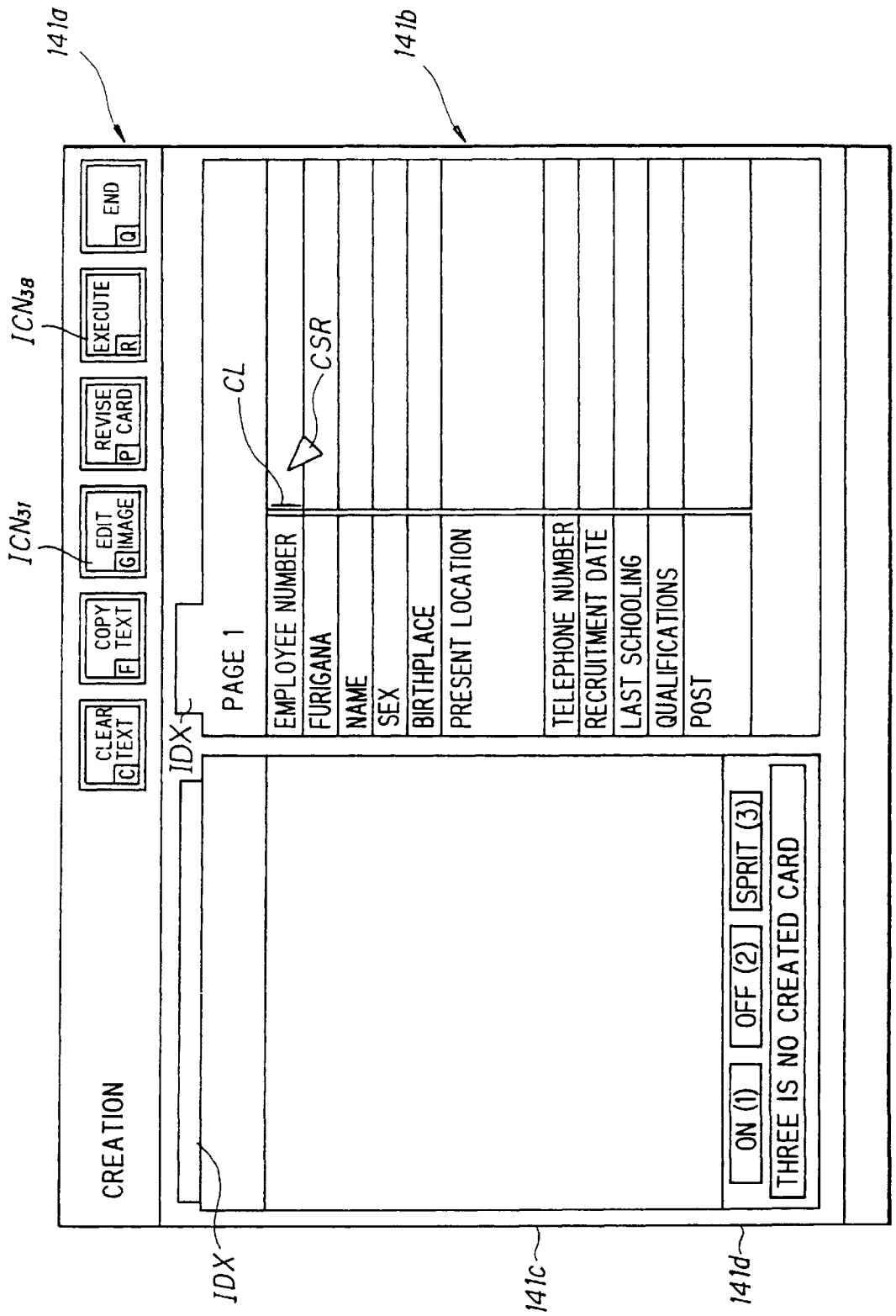
FIG. 12 is a card creating screen referred to when inputting text information.

As a result, the processor 12 reads the card creation screen out of the menu-screen storage area 11b (see FIG. 4) of the hard disk 11 and inputs this screen to the display device 14. The display device 14 stores the card creation screen in the menu screen memory 14b (see FIG. 6) so that a display of the kind shown in FIG. 12 is presented on the display unit 14a at step 102. Shown in FIG. 12 are an icon display area 141a, a text area 141b which displays text items, an image area 141c which displays images, and a display control area 141d for turning the image display on and off and for designating multiple display of reduced images. An index IDX is provided at the top of the text area 141b and image area 141c. A desired page can be displayed by designating the index IDX using the mouse cursor CSR. The number of pages of text and the number of pages of images can be identified by the number of indices IDX. Moreover, the smaller the number of pages, the larger the displayed size of each index IDX.

In the state shown in FIG. 12, text information is inputted from the keyboard and stored in the RAM 12c at step 103. More specifically, the first item (employee number) in the text area 141b is designated by the mouse cursor CSR and the mouse switch is turned on. As a result, a caret CL is moved to the position of the first character of the designated item to make possible the entry of an employee number. This is followed by entering the employee number from the keyboard. The entered character code is stored in the RAM 12c and is inputted to the display device 14 so as to be displayed. When the entry of the employee number ends, the caret is moved to the next line and the next item of text is entered. This operation is repeated in similar fashion to enter all of the items of text. In order to turn the page, the index IDX is designated using the mouse cursor CSR.

Figure 13:
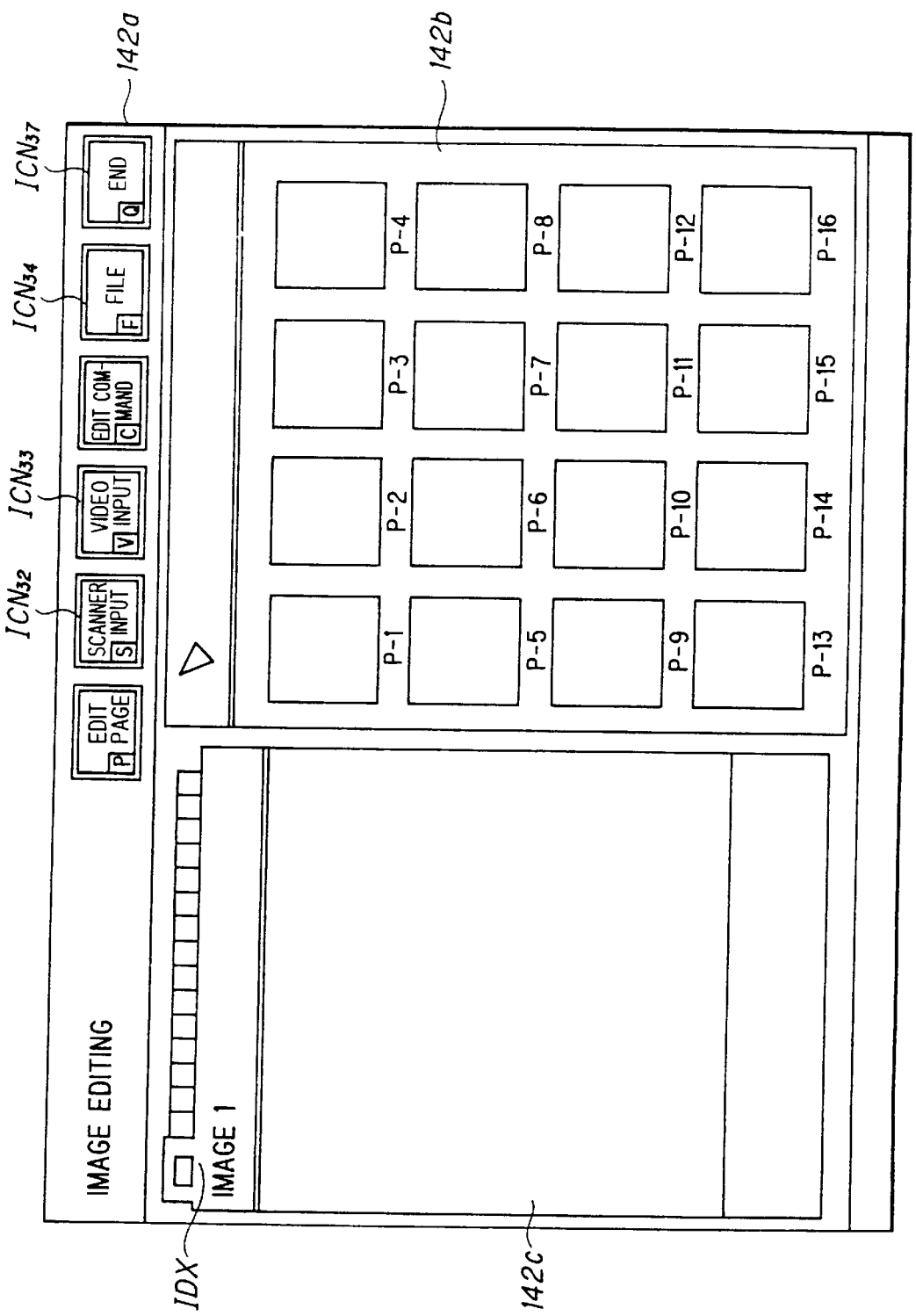
FIG. 13 is a card creating screen referred to when editing an image.

When entry of the text information for forming a card is completed by the foregoing operation, an icon $ICN_{31}$ signifying "EDIT IMAGE" is designated. In response to designation of this icon, the processor 12 reads the image editing screen out of the menu-screen storage area 11b and inputs this screen to the display device 14 so that a display of the kind shown in FIG. 13 is presented on the display unit 14a (step 104). Display areas shown in FIG. 13 are an icon display area 142a, a reduced-image display area 142b for displaying reduced images of N-number of original images, namely reduced images of pages that have already been registered, and an image display area 142c for displaying the original image.

Next, based upon whether an image is entered using an image scanner, a video camera or an image file already created, one of the icons $ICN_{32}$, $ICN_{33}$, $ICN_{34}$ is designated by the mouse cursor or keys (steps 105a–105c).

Figure 14:
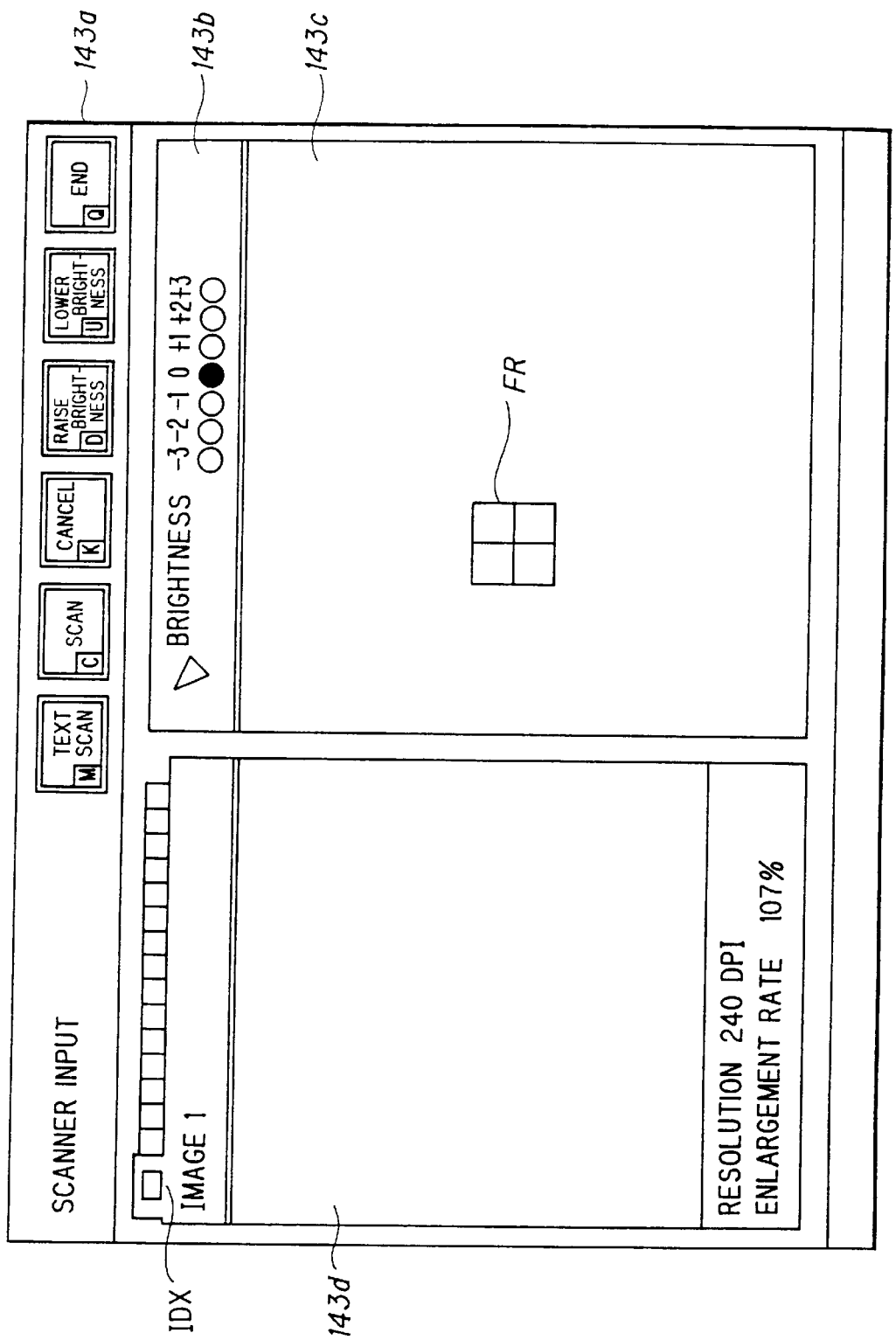
FIG. 14 is a card creating screen referred to in a case where an image is inputted by using a scanner.
Figure 15:
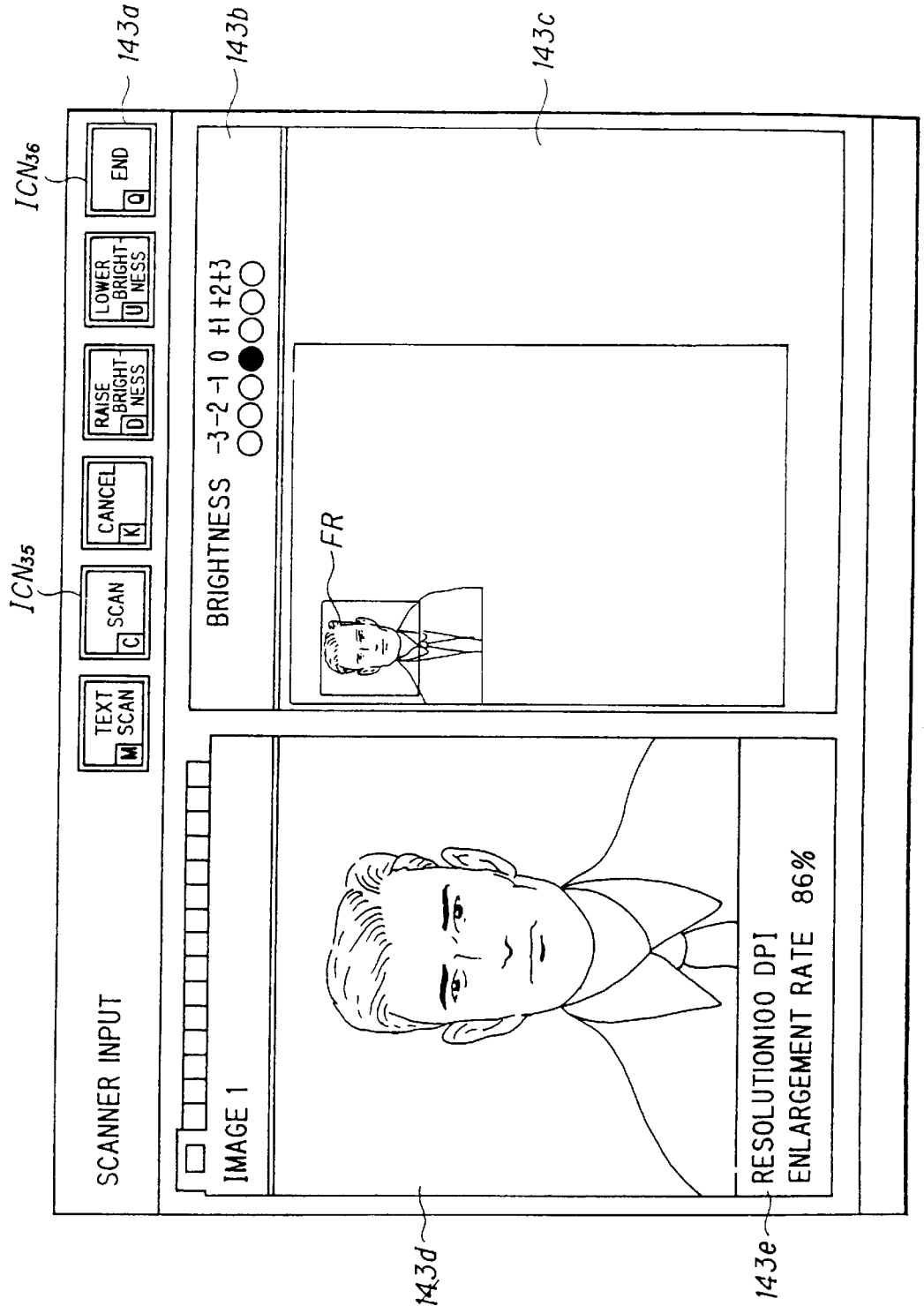
FIG. 15 is a card creating screen referred to in a case where an image is inputted by using a scanner.

If the icon $ICN_{32}$ is designated because of image input using the image scanner, the processor 12 causes the display device 14 to display an image-scanner input screen shown in FIG. 14. Areas shown in FIG. 14 include an icon display area 143a, a brightness display area 143b, a first image area 143c for displaying an image read from a scanner and for designating a zone to be cut from the image, and a second image area 143d for displaying the original image. FR represents a zone designating frame used to designate the zone to be cut from the image.

In the state illustrated, a prescribed index among 16 indices IDX shown in the second image area 143d is designated by the mouse cursor to thereby designate the image page which is to accept the image. Next, when a frontal photograph of the employee's face is inputted by being read by the image scanner (image input unit) 15, the processor 12 stores this image in the image work area 11a of the hard disk 11 and inputs the image to the display device 14 so that the image will be displayed in the first image area 143c (see FIG. 15). Thereafter, the zone designating frame FR is moved by the mouse cursor so as to be positioned at the center of the image from which a cut is to be taken. Next, if the size of the cutting zone is to be set, the resolution and rate of enlargement are displayed in an area 143e. If the icon $ICN_{35}$ is designated under these conditions, the processor 12 cuts out the portion of the image (the original image) within the set zone and inputs it to the display device 14 so that it will be displayed in enlarged form in the second image area 143d. The image work area 11a holds the cut-out portion of the image (the original image) temporarily.

Thereafter, the image of each page forming a card is inputted in similar fashion and is held in the image work area 11a (step 106).

When the entry of all images has been completed, the icon $ICN_{36}$ is designated to enter "END" and display the image editing screen of FIG. 13 on the display device 14. If the icon $ICN_{37}$ is designated to enter "END" under these conditions, the card creation screen of FIG. 12 is displayed. In this case, the text information of the first page is displayed in the text area 141b and the first image is displayed in the image area 141c. Under these conditions, the icon $ICN_{38}$ is designated to enter "EXECUTE" (step 107).

When the icon $ICN_{38}$ is designated, the processor 12 reads the original image of the first page that has been stored in the image work area 11a of the hard disk 11 (step 108). Next, the processor 12 reduces the size of the original image to ¼ in each of the horizontal and vertical directions as by thinning-out processing, subjects the reduced image to run-length compression and stores the result in the image work area 11a (step 109).

When compression of the reduced image ends, the image on the first page is compressed by the initially set compression method (run-length compression, LZW compression or DCT compression) and the compressed image is stored in the image work area 11a (step 110). Thereafter, the storage locations of the reduced image and original image in the card storage area 11c are decided and a header is created upon taking into account these storage locations (addresses), size and compression method (step 111). An image file is created from the header, the reduced image and the original image (step 112), and the image file is registered in the card storage area 11c of the hard disk 11 in correlation with a card number. Thereafter, the processing of steps 108–113 is repeated to register all image files forming the card in the card storage area 11. Processing for creating one card is then terminated.

(e) Card Display/Search Processing

Figure 16:
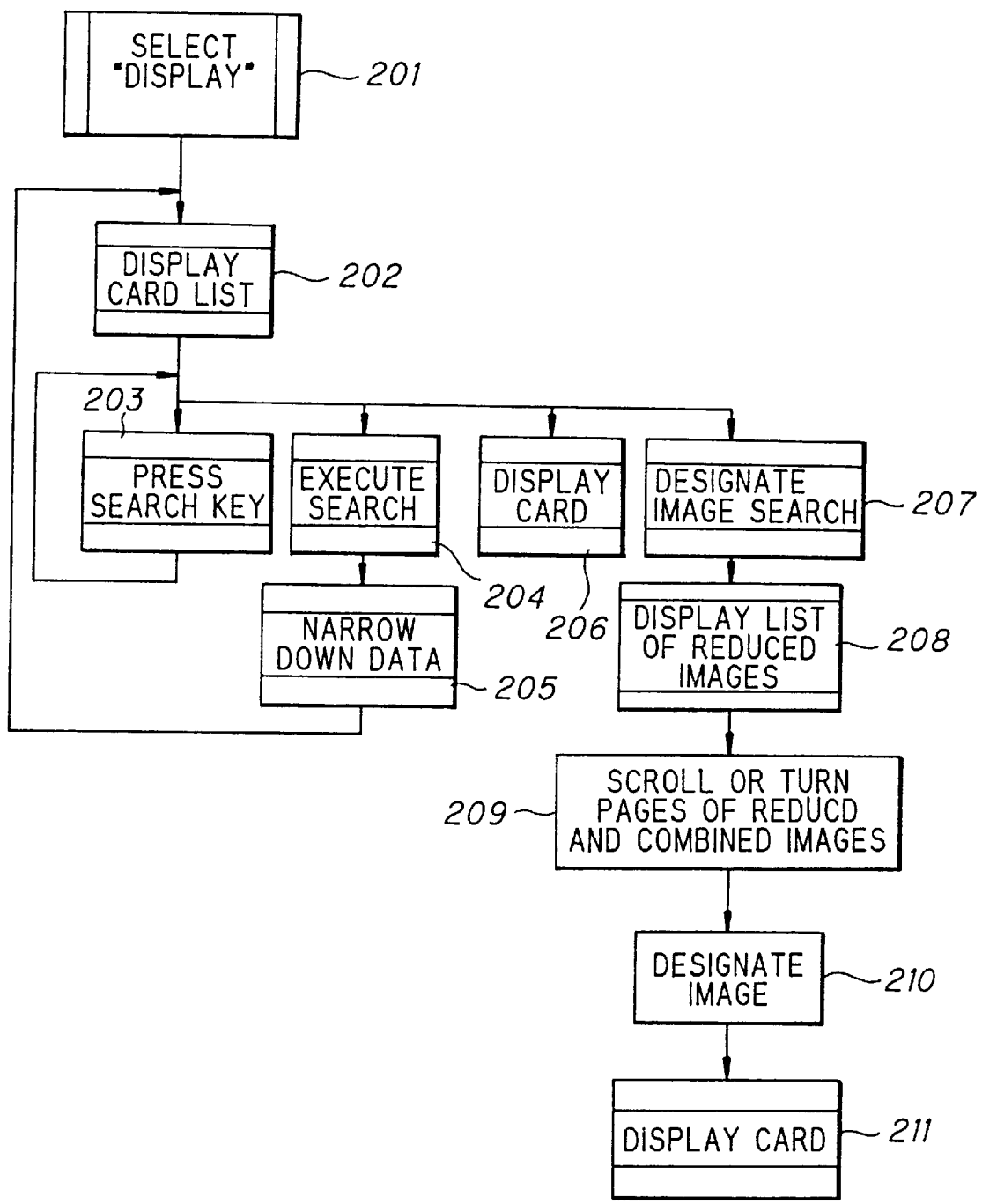
FIG. 16 is a flowchart illustrating card display and search processing.

FIG. 16 is a flowchart showing the processing for displaying and retrieving cards, and FIGS. 17–21 show examples of screens for card display/search. Card display/search processing will be described with reference to these drawings.

"DISPLAY" is selected at step 201 by designating the icon $ICN_1$ using the mouse cursor or keys in a state in which the top-menu screen (FIG. 9) is being displayed on the display device 14.

Figure 17:
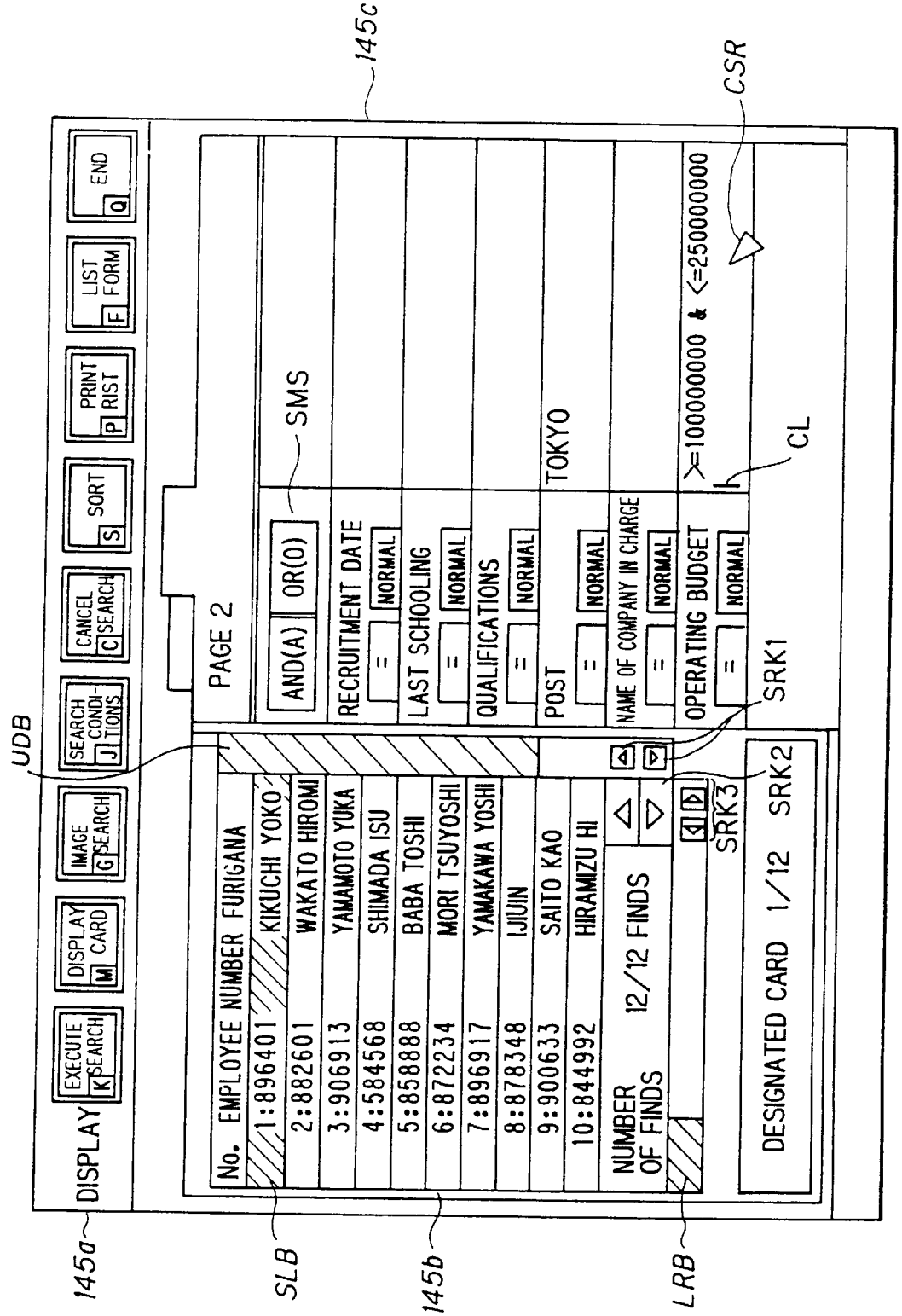
FIG. 17 is a card display and search screen for displaying a card list.

As a result, the processor 12 reads the card display/search screen out of the menu-display storage area 11b (see FIG. 4) of the hard disk 11, inputs this screen to the display device 14, reads the text information of each card from the card storage area 11c and inputs this information to the display device 14, whereby the search display screen is displayed, as shown in FIG. 17 (step 202). Areas shown on the search screen of FIG. 17 include an icon display area 145a, a list display area 145b and a search area 145c.

A list of all cards (namely a list of character strings composed of a predetermined number of characters at the beginning of each string in the text information) is displayed in the list display area 145b. Ordinarily, the list of all cards cannot fit in the display of one screen. However, the list of all cards can be viewed by performing a scrolling operation up or down. More specifically, when a first scroll key SRK1 is designated by the mouse cursor and the mouse switch is turned on, the list display can be scrolled one line at a time. When a second scroll key SRK2 is designated by the mouse cursor and the mouse switch is turned on, the list display can be scrolled ten lines at a time. In this case, the position of the end of a vertical scroll bar UDB is moved up or down in accordance with an up-down scrolling operation. Further, though only a predetermined number of characters of the text information can be displayed in the list display, it is possible to change the content of the displayed text information by scrolling operation to the left or right. Specifically, when a third scroll key SRK3 is designated by the mouse cursor and the mouse switch is turned on, the text information can be scrolled one character at a time. The position of the end of a horizontal scroll bar LRB is moved to the left or right in accordance with a left-right of the scrolling operation.

The search area 145c displays search items as well as search conditions (keywords and numerical ranges) set from these items.

Next, the search conditions are entered. For example, if employees whose post is Tokyo and whose operating budget is 100,000,000 to 250,000,000 are to be retrieved, the second page (Page 2) of the search items is opened, the post item is designated using the mouse cursor CSR, the caret CL is moved to the space of the post item and "Tokyo" is entered from the keyboard. Similarly, "≧100,000,000 & ≦250,000,000" is entered as the operating budget. Next, the logical product (AND) of these search conditions is inputted using a search-mode switch SMS. In a case where the search is performed in accordance with the logical sum (OR) of these search conditions, the logical sum (OR) is set using the search-mode switch SMS (step 203).

Figure 18:
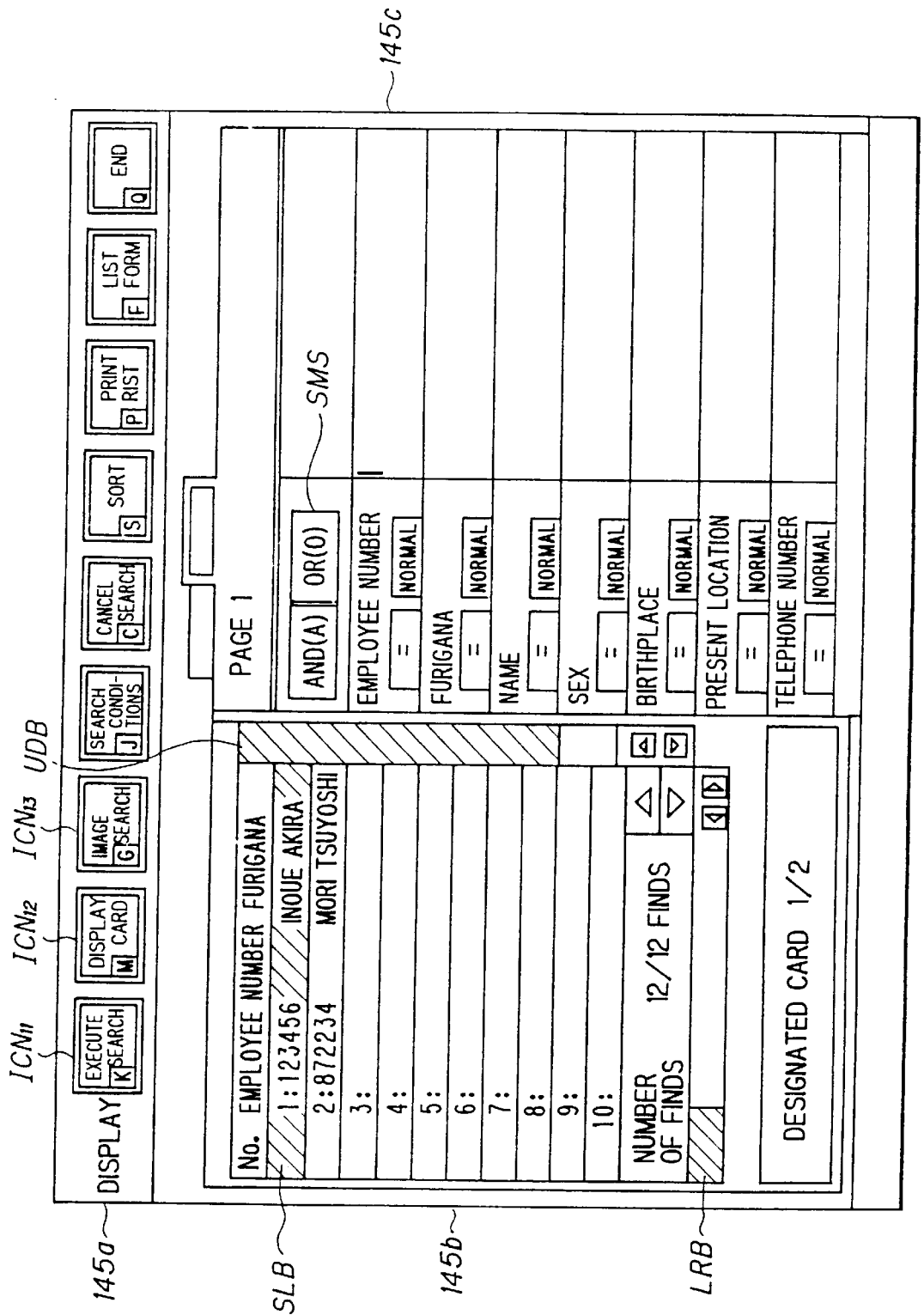
FIG. 18 is a card display and search screen for displaying a card list after the list has been narrowed down.
Figure 21:
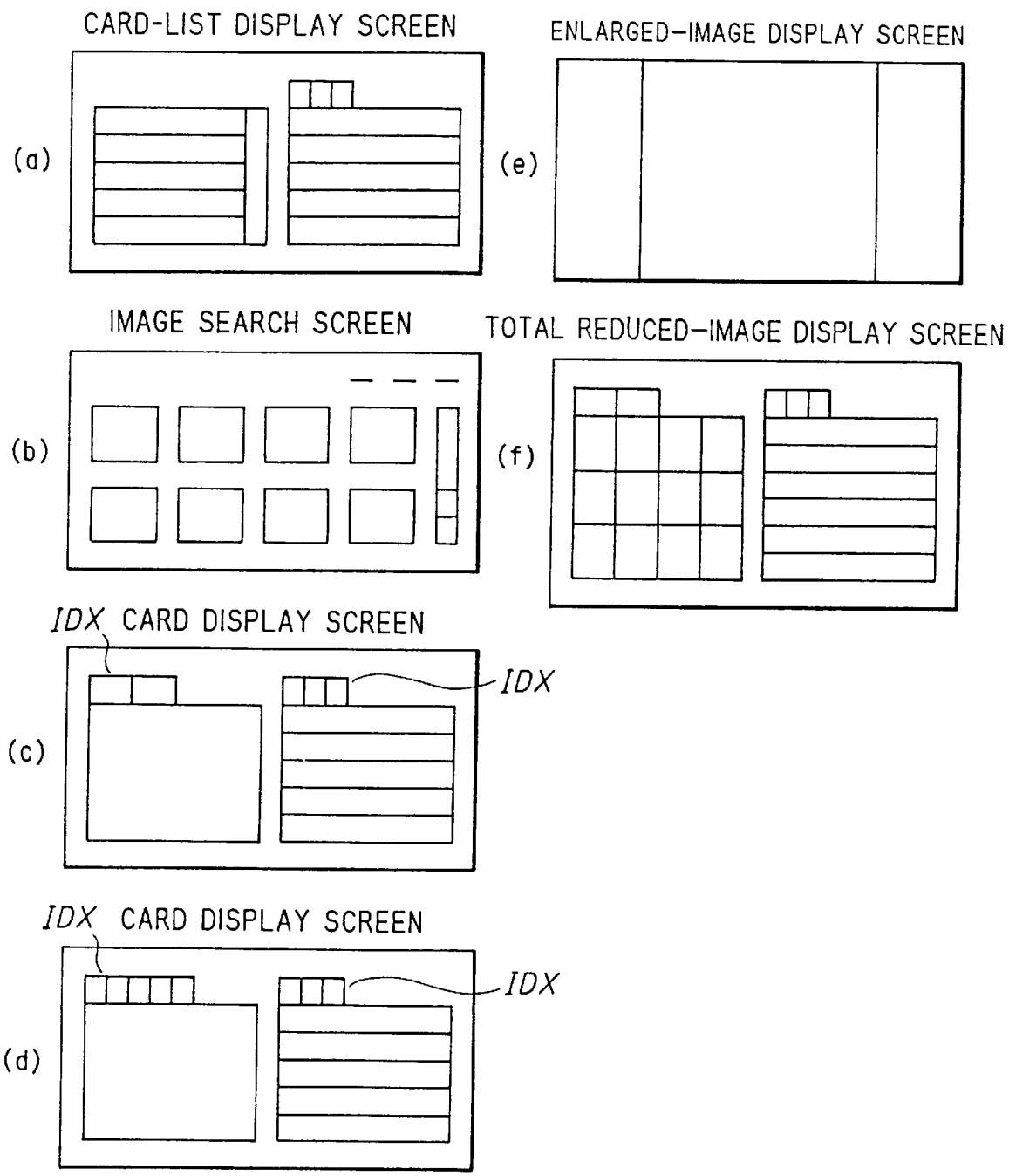
FIG. 21 is a diagram for giving an overview of various display screens displayed at the time of a card search.

When "EXECUTE SEARCH" is inputted by designating the icon $ICN_{11}$ after entry of the search conditions (step 204), the processor 12 collates the text information of each card and the search conditions, finds the cards which satisfy the search conditions, saves the cards in the RAM 12c and causes a list solely of the found cards to be displayed in the list display area 145b (FIG. 18; step 205). In FIG. 18, "NUMBER OF FINDS: 2/12" indicates that two cards which satisfy the search conditions have been found among 12 cards.

By virtue of the foregoing operation, cards which are the subject of search can be narrowed down. Thereafter, search conditions can be entered if necessary to narrow down cards which are the subject of a search even further.

At the conclusion of the narrowing-down operation, a list search and an image search are available in order to select a card. A list search is a method of selecting a target card from the list display area 145b. An image search is a method of selecting a target card from among images that have been reduced in size and combined.

A select bar SLB (the shaded portion in FIGS. 17 and 18) is positioned on the target card when the list search is carried out. More specifically, the target card is designated by the mouse cursor, after which the mouse switch is turned on to place the select bar SLB on the target card. In FIG. 18, the select bar SLB is situated on the first card of the two cards displayed. Next, the icon $ICN_{12}$ is designated to input "DISPLAY CARD", whereupon the processor 12 causes the image on the first page of the card designated by the caret bar CLB as well as the text items of the first page to be displayed, as illustrated in FIG. 19 (step 206).

Areas shown in FIG. 19 are an icon display area 146a, an image area 146b, a text area 146c, and a display control area 146d for turning the image display on and off and for designating multiple display of reduced images. The number of indices in the image area 146b and text area 146c are three and two, respectively. This makes it possible for the operator to recognize that the card is composed of three images (e.g., frontal and side photographs of the employee's face and a full-body photograph) and two pages of text information. When the index of the desired page is designated by the mouse cursor, the processor 12 displays the image or text information of the designated page. Further, the processor 12 displays the image when "ON" in the display control area 146d has been designated and erases the image when "OFF" has been designated. If "SPLIT" is designated, the processor 12 combines the N-number of reduced images (the reduced images of the frontal and side photographs of the employee's face and the reduced image of the full-body photograph) which constitute the card and causes this combined image to be displayed in the image display area 146b en masse. Further, if the mouse switch is turned on while the image presently displayed is being designated by the mouse cursor, the processor 12 uses the original image information to enlarge the displayed image by approximately two times.

In the case of the image search, the icon ICN13 in FIG. 18 is designated to enter "IMAGE SEARCH" (step 207). In response, the processor 12 reads out the cards which are the subject of a search (and which have been saved in the RAM 12c by the narrowing-down processing) and causes the display device 14 to display the screen of reduced and combined images, namely a screen in which the reduced images $P_1$–$P_8$ of each of the first pages are combined (step 208). The reduced images are generated using the reduced-image information.

In the case of FIG. 18, the cards which are the subject of the search have been narrowed down to two, and therefore only two reduced images are displayed as the reduced and combined images, as illustrated in FIG. 20.

The operator glances as the reduced and combined images and looks for the desired image. If the desired image is not present, a scroll key SRK4 is designated by the mouse cursor and scrolling is performed until the desired image comes into view. Alternatively, icons $ICN_{14}$, $ICN_{15}$ may be designated by the mouse cursor or keys to enter "PREVIOUS PAGE" OR "NEXT PAGE" so that the display of reduced image can be changed over successively eight images at a time. When the desired image has been displayed by such a scrolling operation or a page-turning operation, the image is designated by the mouse cursor or keys (steps 209, 210).

When a target card has been designated, the processor 12 causes the image of the first page of the designated card as well as the test items of the first page to be displayed, as shown in FIG. 19 (step 211).

FIGS. 21(a)–21(f) are diagrams giving an overview of the various display screens displayed at the time of a card search, in which FIG. 21(a) is the card-list display screen (see FIG. 17), FIG. 21(b) is the image search screen (see FIG. 20), FIG. 21(c) is the card display screen (see FIG. 19) which displays a card composed of two images and three pages of text information, FIG. 21(d) is a card display screen which displays a card composed of five images and three pages of text information, FIG. 21(e) is an enlarged-image display screen which displays an image enlarged by approximately two times, and FIG. 21(f) is a reduced-image display screen which displays reduced images of all N-number of images by designating "SPLIT".

As many apparently widely different embodiments of the present invention can be made without departing from the spirit and scope thereof, it is to be understood that the invention is not limited to the specific embodiments thereof except as defined in the appended claims.

What is claimed is:

1. A function designate method for designating a variety of functions to be performed by a control unit, comprising:

displaying a plurality of graphic icons under ordinary circumstances, which are for designating a variety of functions and for specifying one of the graphic icons corresponding to the function to be executed by a cursor;

displaying character icons, each of which includes one of said graphic icons and one character for designating a key on a keyboard, when a predetermined control key has been pressed, in a case where a plurality of graphic icons are displayed;

specifying one of the graphic icons by simultaneously pressing the control key and a key corresponding to a character displayed with the graphic icon; and designating a function that has been allocated to said graphic icon to the control unit.

2. A function designate method according to claim 1, wherein said one of the graphic icons and said one character are displayed together in the character icon so that they are capable of being recognized.

* * * * *